United States Patent
Verreault et al.

(10) Patent No.: US 9,841,237 B2
(45) Date of Patent: Dec. 12, 2017

(54) UNEVENLY SPACED INDUCTION COIL FOR MOLTEN ALLOY CONTAINMENT

(71) Applicant: CRUCIBLE INTELLECTUAL PROPERTY, LLC, Rancho Santa Margarita, CA (US)

(72) Inventors: Adam A. Verreault, Dove Canyon, CA (US); Sean T. O'Keeffe, Rancho Santa Margarita, CA (US); Joseph W. Stevick, Rancho Santa Margarita, CA (US); Brennan D. Yahata, Rancho Santa Margarita, CA (US)

(73) Assignee: Crucible Intellectual Property, LLC, Rancho Santa Margarita, CA (US)

( * ) Notice: Subject to any disclaimer, the term of this patent is extended or adjusted under 35 U.S.C. 154(b) by 0 days.

(21) Appl. No.: 15/154,848

(22) Filed: May 13, 2016

(65) Prior Publication Data
US 2016/0258688 A1 Sep. 8, 2016

Related U.S. Application Data

(63) Continuation of application No. 13/939,939, filed on Jul. 11, 2013, now Pat. No. 9,346,099.

(51) Int. Cl.
*B22D 17/10* (2006.01)
*B22D 17/20* (2006.01)
(Continued)

(52) U.S. Cl.
CPC ............ *F27D 11/06* (2013.01); *B22D 17/04* (2013.01); *B22D 17/10* (2013.01);
(Continued)

(58) Field of Classification Search
CPC . H05B 6/30; H05B 6/36; H05B 6/367; H05B 6/44
See application file for complete search history.

(56) References Cited

U.S. PATENT DOCUMENTS

| 1,943,802 A | 1/1934 | Northrup |
| 3,014,255 A | 12/1961 | Gerhard Muller et al. |

(Continued)

FOREIGN PATENT DOCUMENTS

| CA | 2010961 | 3/1997 |
| CN | 1355857 | 6/1986 |

(Continued)

OTHER PUBLICATIONS

Inoue et al., "Bulk amorphous alloys with high mechanical strength and good soft magnetic properties in Fe—TM—B(Tm=IV-VIII group transition metal) system", Appl. Phys. Lett., vol. 710, p. 464 (1997).

(Continued)

*Primary Examiner* — Kevin E Yoon
(74) *Attorney, Agent, or Firm* — Brownstein Hyatt Farber Schreck, LLP

(57) ABSTRACT

Various embodiments provide an apparatus and methods for containing the molten materials within a melt zone during melting. The apparatus may include a vessel configured to receive a material for melting therein and an induction coil with unevenly spaced turns along its length. Induction coil can have a series of turns acting as a first (e.g., load) induction coil and a series of turns acting as a second (e.g., containment) induction coil. The material in the vessel can be heated and contained by the separated turns of the induction coil. A plunger can also assist in containing material during melting. Once the desired temperature is achieved and maintained for the molten material, operation of the induction coil can be stopped and the molten material can be ejected from the vessel into a mold using the plunger.

20 Claims, 8 Drawing Sheets

US 9,841,237 B2

Page 2

(51) Int. Cl.
- H05B 6/36 (2006.01)
- F27D 11/06 (2006.01)
- B22D 25/06 (2006.01)
- B22D 27/04 (2006.01)
- B22D 27/20 (2006.01)
- B22D 41/01 (2006.01)
- C22C 45/00 (2006.01)
- C22C 45/10 (2006.01)
- B22D 18/06 (2006.01)
- B22D 37/00 (2006.01)
- B22D 17/04 (2006.01)
- H05B 6/44 (2006.01)
- C22C 45/02 (2006.01)
- F27D 3/00 (2006.01)
- F27D 3/14 (2006.01)
- F27D 11/12 (2006.01)
- H05B 6/06 (2006.01)
- H05B 6/30 (2006.01)

(52) U.S. Cl.
CPC ......... B22D 17/2038 (2013.01); B22D 18/06 (2013.01); B22D 25/06 (2013.01); B22D 27/04 (2013.01); B22D 27/20 (2013.01); B22D 37/00 (2013.01); B22D 41/01 (2013.01); C22C 45/00 (2013.01); C22C 45/003 (2013.01); C22C 45/008 (2013.01); C22C 45/02 (2013.01); C22C 45/10 (2013.01); F27D 3/0025 (2013.01); F27D 3/14 (2013.01); F27D 11/12 (2013.01); H05B 6/067 (2013.01); H05B 6/30 (2013.01); H05B 6/36 (2013.01); H05B 6/367 (2013.01); H05B 6/44 (2013.01); Y02P 10/253 (2015.11)

(56) References Cited

U.S. PATENT DOCUMENTS

| | | | |
|---|---|---|---|
| 3,671,029 A | 6/1972 | Kurlsson | |
| 3,731,727 A | 5/1973 | Mitamura et al. | |
| 3,793,468 A | 2/1974 | Akers | |
| 3,857,696 A * | 12/1974 | Aldersley | F27B 14/061 75/10.14 |
| 4,135,568 A | 1/1979 | Brooks | |
| 4,265,294 A | 5/1981 | Gaule | |
| 4,612,973 A | 9/1986 | Whang | |
| 4,678,024 A | 7/1987 | Hull | |
| 4,693,299 A | 9/1987 | Kuznetsov et al. | |
| 4,738,713 A | 4/1988 | Stickle et al. | |
| 4,799,532 A | 1/1989 | Mizuhara | |
| 4,887,798 A | 12/1989 | Julius | |
| 5,003,551 A | 3/1991 | Mortimer | |
| 5,055,025 A | 10/1991 | Muller | |
| 5,087,804 A | 2/1992 | McGaffigane | |
| 5,288,344 A | 2/1994 | Peker et al. | |
| 5,333,646 A | 8/1994 | Delot | |
| 5,368,659 A | 11/1994 | Peker et al. | |
| 5,487,421 A | 1/1996 | Gerber | |
| 5,616,024 A | 4/1997 | Nobori | |
| 5,618,359 A | 4/1997 | Lin et al. | |
| 5,711,363 A | 1/1998 | Scruggs et al. | |
| 5,718,280 A | 2/1998 | Matsuura et al. | |
| 5,735,975 A | 4/1998 | Lin et al. | |
| 5,896,642 A | 4/1999 | Peker | |
| 5,976,247 A | 11/1999 | Hansen et al. | |
| 5,979,534 A * | 11/1999 | Shibata | B22D 17/007 164/113 |
| 6,021,840 A | 2/2000 | Colvin | |
| 6,267,170 B1 | 7/2001 | Onuki | |
| 6,267,171 B1 | 7/2001 | Onuki | |
| 6,283,197 B1 | 9/2001 | Kono | |
| 6,325,868 B1 | 12/2001 | Kim et al. | |
| 6,371,195 B1 | 4/2002 | Onuki | |
| 6,427,753 B1 | 8/2002 | Inoue | |
| 6,502,624 B1 | 1/2003 | Williams et al. | |
| 6,875,293 B2 | 4/2005 | Peker | |
| 6,994,146 B2 | 2/2006 | Wang | |
| 7,017,645 B2 | 3/2006 | Johnson et al. | |
| 7,235,910 B2 | 6/2007 | Decristofaro et al. | |
| 7,377,303 B2 | 5/2008 | Go | |
| 7,488,170 B2 | 2/2009 | Yuasa et al. | |
| 7,575,040 B2 | 8/2009 | Johnson | |
| 7,708,844 B2 | 5/2010 | Muramatsu | |
| 7,906,219 B2 | 3/2011 | Ohara | |
| 9,346,099 B2 | 5/2016 | Verreault et al. | |
| 2002/0005233 A1 | 1/2002 | Schirra et al. | |
| 2005/0028961 A1 | 2/2005 | Toyoshima et al. | |
| 2005/0111518 A1 | 5/2005 | Roach et al. | |
| 2005/0242454 A1 | 11/2005 | Yuasa et al. | |
| 2006/0042773 A1 | 3/2006 | Eisen | |
| 2006/0254747 A1 | 11/2006 | Ishida et al. | |
| 2007/0079907 A1 | 4/2007 | Johnson et al. | |
| 2007/0277953 A1 | 12/2007 | Ward et al. | |
| 2008/0118387 A1 | 5/2008 | Demetriou et al. | |
| 2009/0236494 A1 | 9/2009 | Hata et al. | |
| 2010/0084052 A1 | 4/2010 | Farmer et al. | |
| 2010/0098967 A1 | 4/2010 | Schroers | |
| 2010/0300148 A1 | 12/2010 | Demetriou et al. | |
| 2011/0011750 A1 | 1/2011 | Lovens | |
| 2011/0108231 A1 | 5/2011 | Zheng et al. | |
| 2011/0164650 A1 | 7/2011 | Chen et al. | |
| 2012/0103262 A1* | 5/2012 | Seiki | C30B 29/36 118/726 |
| 2014/0102661 A1 | 4/2014 | Waniuk et al. | |

FOREIGN PATENT DOCUMENTS

| | | |
|---|---|---|
| CN | 101487106 | 7/2009 |
| CN | 102527982 | 7/2012 |
| CN | 103722147 | 4/2014 |
| DE | 19902002 A1 | 7/2000 |
| EP | 0845316 A1 | 6/1998 |
| EP | 1013363 A1 | 6/2000 |
| EP | 1415740 A1 | 5/2004 |
| FR | 1508992 A1 | 1/1968 |
| FR | 2665654 A1 | 2/1992 |
| GB | 392764 | 5/1933 |
| GB | 574914 | 1/1946 |
| GB | 784363 | 10/1957 |
| JP | 55036033 | 3/1980 |
| JP | S61119368 | 6/1986 |
| JP | 05131255 A | 5/1993 |
| JP | 6212205 A | 8/1994 |
| JP | 8013111 A | 1/1996 |
| JP | H09155533 | 6/1997 |
| JP | H09155533 A | 6/1997 |
| JP | 9272929 A | 10/1997 |
| JP | H09323146 | 12/1997 |
| JP | H09323146 A | 12/1997 |
| JP | H09272929 A | 4/1999 |
| JP | 2000024767 A | 1/2000 |
| JP | 2000326065 | 11/2000 |
| JP | 2001071113 A | 3/2001 |
| JP | 2001259821 A | 9/2001 |
| JP | 20010303218 A | 10/2001 |
| JP | 2002029727 A | 1/2002 |
| JP | 2003336971 | 11/2003 |
| JP | 2003336971 A | 11/2003 |
| JP | 2004050269 A | 2/2004 |
| JP | 2006122992 | 5/2006 |
| JP | 2006289466 | 10/2006 |
| JP | 2009068101 A | 4/2009 |
| JP | 2009172627 A | 8/2009 |
| JP | 2009173964 A | 8/2009 |
| JP | 2010036210 | 2/2010 |
| JP | 2010241628 | 10/2010 |
| JP | 2010241628 A | 10/2010 |
| WO | WO0037201 | 6/2000 |
| WO | WO2005004559 A2 | 1/2005 |
| WO | WO2006127792 A1 | 11/2006 |
| WO | WO2008046219 A1 | 4/2008 |
| WO | WO2009067512 A1 | 5/2009 |

(56) References Cited

FOREIGN PATENT DOCUMENTS

| WO | WO2010108744 A1 | 9/2010 |
|----|----|----|
| WO | WO2010111701 A1 | 9/2010 |
| WO | WO 2013/048429 | 4/2013 |
| WO | WO2013048249 A | 4/2013 |

OTHER PUBLICATIONS

Shen et al., "Bulk Glass Co43Fe20Ta5.5B31.5 Alloy with High Glass-Forming Ability and Good Soft Magnetic Properties", Materials Transactions, vol. 42 No. 10 (2001) pp. 2136-2139.

International Search Report and Written Opinion issued in PCT/US2011/052354, dated Mar. 16, 2012.

International Search Report and Written Opinion issued in PCT/US2011/056399, dated Jul. 9, 2012.

International Search Report and Written Opinion issued in PCT/US2011/054153, dated Jun. 13, 2012.

International Search Report and Written Opinion issued in PCT/US2012/022227, dated Jan. 15, 2013.

Wolf, S. et al. (1986), Silicon Processing for the VLSI Era: vol. 1—Process Technology. Lattice Press. pp. 531-534, 546.

Walker, et al. (1991), CRC Handbook of Metal Etchants. pp. 287-291.

Kohler (1999), Etching in Microsystem Technology, John Wiley & Son Ltd. p. 329.

McDeavitt et al., "High Temperature Interaction Behavior at Liquid Metal-Ceramic Interfaces", Journal of Materials Engineering and Performance, vol. 11, Aug. 2002.

Kargahi et al., "Analysis of failure of conducting crucible used in induction metal", Aug. 1988.

Inoue et al., "Microstructure and Properties of Bulky Al84Ni10Ce6 Alloys with Amorphous Surface Layer Prepared by High-Pressure Die Casting", Materials Transactions, JIM, vol. 35, No. 11 (1994), pp. 808-813.

Japanese Office Action dated Sep. 24, 2015, JP Application No. 2014-139353, 5 pages.

\* cited by examiner

UNEVENLY SPACED INDUCTION COIL FOR MOLTEN ALLOY CONTAINMENT

CROSS REFERENCE TO RELATED APPLICATION(S)

This application is a continuation of U.S. patent application Ser. No. 13/939,939, entitled "Unevenly Spaced Induction Coil for Molten Alloy Containment", filed on Jul. 11, 2013, which is incorporated by reference in its entirety as if fully disclosed herein.

FIELD

The present disclosure is generally related to apparatus and methods for melting materials and for containing the molten materials within melt zone during melting.

BACKGROUND

Some injection molding machines use an induction coil to melt material before injecting the material into a mold. However, in horizontally disposed machines where the material is melted in a vessel positioned for horizontal ejection, gravitational forces on the molten metal, in addition to magnetic fluxes from the induction coil tend to cause the melt to move away from the region of highest magnetic flux, e.g., to flow towards and/or out of the melt zone, which can make it difficult to control the uniformity and temperature of the melt.

Current solutions for melting in vessels designed for horizontal ejection include use of a gate that is in contact with the melt and physically blocks the melt from flowing (horizontally) out of the induction coil in the melt zone. Problems arise, however, due to gate configurations, wherein the gate is a point of contact with the melt and impurities may be introduced by the gate. In addition, the gate configuration may reduce the space available for the melt zone because the gate must be actuated up and down in order to allow the melt to flow. Further, the melt may undesirably flow towards and/or out of the horizontal ejection path of the vessel due to challenge of the timing control as when to raise the gate during the injection process of the melt. Also, even if the gate material is insulating, the gate will pull heat from the melt, thus locally reducing the temperature of the melt, negatively affecting the castability of the molten alloy. Furthermore, the gate is potentially a consumable part and needs to be replaced after a certain number of uses which increases the cost per cast on the system.

It is desirable to contain the melt in the melt zone of horizontally designed systems at desired high temperatures when it is heated or melted, but without introducing a gate to physically block the melt.

SUMMARY

A proposed solution according to embodiments herein for melting materials (e.g., metals or metal alloys) in a vessel is to contain the melt or molten material within melt zone.

In accordance with various embodiments, there is provided an apparatus. The apparatus may include a vessel configured to receive a material for melting therein; and a first induction coil and a second induction coil configured to melt and contain movement of the material in the vessel. The first induction coil and the second induction coil are a single induction coil. The apparatus can be configured to form the material into a BMG part.

In accordance with various embodiments, there is provided a method of melting a material. The method includes: inserting meltable material into a vessel; and operating an induction coil at an RF frequency to form molten material. The induction coil has a first induction coil and a second induction coil configured to melt and contain the meltable material in the vessel.

In accordance with various embodiments, there is provided a method of operating an apparatus. The method includes: inserting meltable material into a vessel; operating an induction coil at an RF frequency to form molten material in the vessel; and stopping operation of the induction coil. The induction coil has a first section and a second section that are operatively connected. The first section and the second section are positioned relatively away from each other along an axis of the vessel such that a space is formed therebetween. The induction coil imposes forces on the molten material in the vessel within the space between the first and second sections of the coil during operation.

In accordance with various embodiments, an apparatus is provided. The apparatus may include a vessel configured to receive a material for melting therein and an induction coil positioned substantially around the vessel. The induction coil has multiple coil turns configured to operate at an RF frequency to form molten material in the vessel. The induction coil is separated into a first section and a second section and has at least one turn between the first section and the second section. The at least one turn is spaced a distance from both of the first section and the second section.

Also, in accordance with an embodiment, the material for melting is a BMG feedstock, and a BMG part may be formed/molded.

DETAILED DESCRIPTION

All publications, patents, and patent applications cited in this Specification are hereby incorporated by reference in their entirety.

The articles "a" and "an" are used herein to refer to one or to more than one (i.e., to at least one) of the grammatical object of the article. By way of example, "a polymer resin" means one polymer resin or more than one polymer resin. Any ranges cited herein are inclusive. The terms "substantially" and "about" used throughout this Specification are used to describe and account for small fluctuations. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Bulk-solidifying amorphous alloys, or bulk metallic glasses ("BMG"), are a recently developed class of metallic materials. These alloys may be solidified and cooled at relatively slow rates, and they retain the amorphous, non-crystalline (i.e., glassy) state at room temperature. Amorphous alloys have many superior properties than their crystalline counterparts. However, if the cooling rate is not sufficiently high, crystals may form inside the alloy during cooling, so that the benefits of the amorphous state can be lost. For example, one challenge with the fabrication of bulk amorphous alloy parts is partial crystallization of the parts due to either slow cooling or impurities in the raw alloy material. As a high degree of amorphicity (and, conversely, a low degree of crystallinity) is desirable in BMG parts, there is a need to develop methods for casting BMG parts having controlled amount of amorphicity.

Figure 1A:
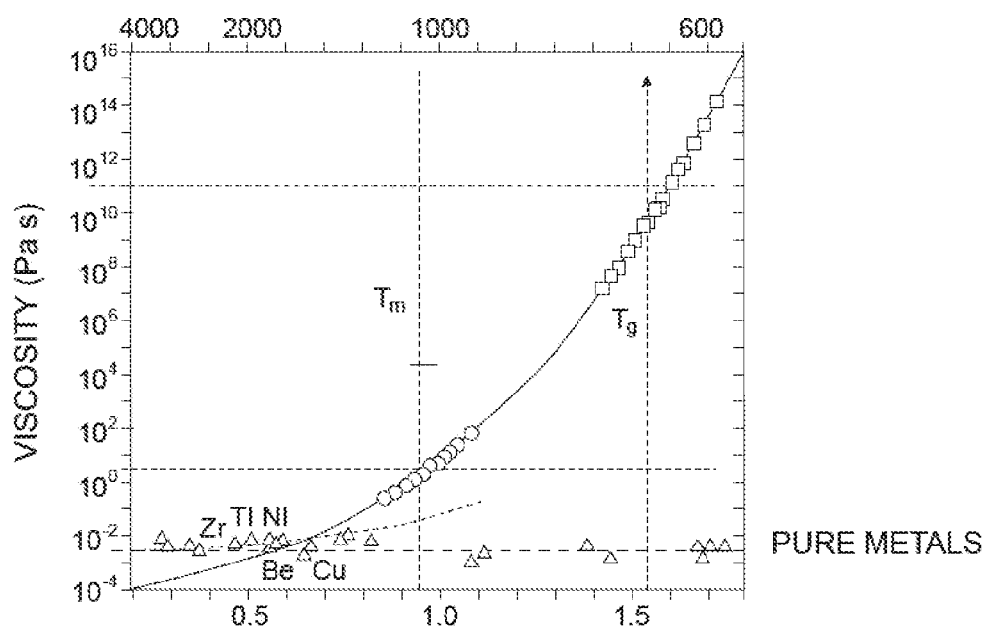
FIG. 1A provides a temperature-viscosity diagram of an exemplary bulk solidifying amorphous alloy.

FIG. 1A (obtained from U.S. Pat. No. 7,575,040) shows a viscosity-temperature graph of an exemplary bulk solidifying amorphous alloy, from the VIT-001 series of Zr—Ti—Ni—Cu—Be family manufactured by Liquidmetal Technology. It should be noted that there is no clear liquid/solid transformation for a bulk solidifying amorphous metal during the formation of an amorphous solid. The molten alloy becomes more and more viscous with increasing undercooling until it approaches solid form around the glass transition temperature. Accordingly, the temperature of solidification front for bulk solidifying amorphous alloys can be around glass transition temperature, where the alloy will practically act as a solid for the purposes of pulling out the quenched amorphous sheet product.

Figure 1B:
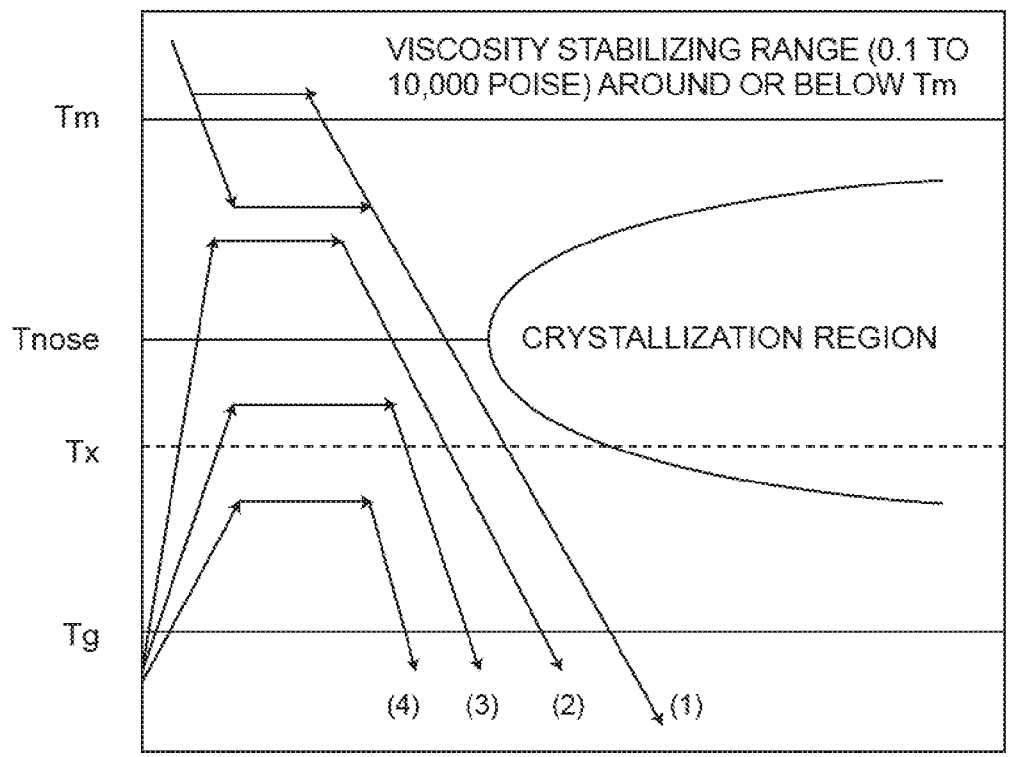
FIG. 1B provides a schematic of a time-temperature-transformation (TTT) diagram for an exemplary bulk solidifying amorphous alloy.

FIG. 1B (obtained from U.S. Pat. No. 7,575,040) shows the time-temperature-transformation (TTT) cooling curve of an exemplary bulk solidifying amorphous alloy, or TTT diagram. Bulk-solidifying amorphous metals do not experience a liquid/solid crystallization transformation upon cooling, as with conventional metals. Instead, the highly fluid, non crystalline form of the metal found at high temperatures (near a "melting temperature" Tm) becomes more viscous as the temperature is reduced (near to the glass transition temperature Tg), eventually taking on the outward physical properties of a conventional solid.

Even though there is no liquid/crystallization transformation for a bulk solidifying amorphous metal, a "melting temperature" Tm may be defined as the thermodynamic liquidus temperature of the corresponding crystalline phase. Under this regime, the viscosity of bulk-solidifying amorphous alloys at the melting temperature could lie in the range of about 0.1 poise to about 10,000 poise, and even sometimes under 0.01 poise. A lower viscosity at the "melting temperature" would provide faster and complete filling of intricate portions of the shell/mold with a bulk solidifying amorphous metal for forming the BMG parts. Furthermore, the cooling rate of the molten metal to form a BMG part has to such that the time-temperature profile during cooling does not traverse through the nose-shaped region bounding the crystallized region in the TTT diagram of FIG. 1B. In FIG. 1B, Tnose is the critical crystallization temperature Tx where crystallization is most rapid and occurs in the shortest time scale.

The supercooled liquid region, the temperature region between Tg and Tx is a manifestation of the extraordinary stability against crystallization of bulk solidification alloys. In this temperature region the bulk solidifying alloy can exist as a high viscous liquid. The viscosity of the bulk solidifying alloy in the supercooled liquid region can vary between $10^{12}$ Pa s at the glass transition temperature down to $10^5$ Pa s at the crystallization temperature, the high temperature limit of the supercooled liquid region. Liquids with such viscosities can undergo substantial plastic strain under an applied pressure. The embodiments herein make use of the large plastic formability in the supercooled liquid region as a forming and separating method.

One needs to clarify something about Tx. Technically, the nose-shaped curve shown in the TTT diagram describes Tx as a function of temperature and time. Thus, regardless of the trajectory that one takes while heating or cooling a metal alloy, when one hits the TTT curve, one has reached Tx. In FIG. 1B, Tx is shown as a dashed line as Tx can vary from close to Tm to close to Tg.

The schematic TTT diagram of FIG. 1B shows processing methods of die casting from at or above Tm to below Tg without the time-temperature trajectory (shown as (1) as an example trajectory) hitting the TTT curve. During die casting, the forming takes place substantially simultaneously with fast cooling to avoid the trajectory hitting the TTT curve. The processing methods for superplastic forming (SPF) from at or below Tg to below Tm without the time-temperature trajectory (shown as (2), (3) and (4) as example trajectories) hitting the TTT curve. In SPF, the amorphous BMG is reheated into the supercooled liquid region where the available processing window could be much larger than die casting, resulting in better controllability of the process. The SPF process does not require fast cooling to avoid crystallization during cooling. Also, as shown by example trajectories (2), (3) and (4), the SPF can be carried out with the highest temperature during SPF being above Tnose or below Tnose, up to about Tm. If one heats up a piece of amorphous alloy but manages to avoid hitting the TTT curve, you have heated "between Tg and Tm", but one would have not reached Tx.

Typical differential scanning calorimeter (DSC) heating curves of bulk-solidifying amorphous alloys taken at a heating rate of 20 C/min describe, for the most part, a particular trajectory across the TTT data where one would likely see a Tg at a certain temperature, a Tx when the DSC heating ramp crosses the TTT crystallization onset, and eventually melting peaks when the same trajectory crosses the temperature range for melting. If one heats a bulk-solidifying amorphous alloy at a rapid heating rate as shown by the ramp up portion of trajectories (2), (3) and (4) in FIG. 1B, then one could avoid the TTT curve entirely, and the DSC data would show a glass transition but no Tx upon heating. Another way to think about it is trajectories (2), (3) and (4) can fall anywhere in temperature between the nose of the TTT curve (and even above it) and the Tg line, as long as it does not hit the crystallization curve. That just means that the horizontal plateau in trajectories might get much shorter as one increases the processing temperature.

Phase

The term "phase" herein can refer to one that can be found in a thermodynamic phase diagram. A phase is a region of space (e.g., a thermodynamic system) throughout which all physical properties of a material are essentially uniform. Examples of physical properties include density, index of refraction, chemical composition and lattice periodicity. A simple description of a phase is a region of material that is chemically uniform, physically distinct, and/or mechanically separable. For example, in a system consisting of ice and water in a glass jar, the ice cubes are one phase, the water is a second phase, and the humid air over the water is a third phase. The glass of the jar is another separate phase. A phase can refer to a solid solution, which can be a binary, tertiary, quaternary, or more, solution, or a compound, such as an intermetallic compound. As another example, an amorphous phase is distinct from a crystalline phase.

Metal, Transition Metal, and Non-Metal

The term "metal" refers to an electropositive chemical element. The term "element" in this Specification refers generally to an element that can be found in a Periodic Table. Physically, a metal atom in the ground state contains a partially filled band with an empty state close to an occupied state. The term "transition metal" is any of the metallic elements within Groups 3 to 12 in the Periodic Table that have an incomplete inner electron shell and that serve as transitional links between the most and the least electropositive in a series of elements. Transition metals are characterized by multiple valences, colored compounds, and the ability to form stable complex ions. The term "nonmetal" refers to a chemical element that does not have the capacity to lose electrons and form a positive ion.

Depending on the application, any suitable nonmetal elements, or their combinations, can be used. The alloy (or "alloy composition") can include multiple nonmetal elements, such as at least two, at least three, at least four, or more, nonmetal elements. A nonmetal element can be any element that is found in Groups 13-17 in the Periodic Table. For example, a nonmetal element can be any one of F, Cl, Br, I, At, O, S, Se, Te, Po, N, P, As, Sb, Bi, C, Si, Ge, Sn, Pb, and B. Occasionally, a nonmetal element can also refer to certain metalloids (e.g., B, Si, Ge, As, Sb, Te, and Po) in Groups 13-17. In one embodiment, the nonmetal elements can include B, Si, C, P, or combinations thereof. Accordingly, for example, the alloy can include a boride, a carbide, or both.

A transition metal element can be any of scandium, titanium, vanadium, chromium, manganese, iron, cobalt, nickel, copper, zinc, yttrium, zirconium, niobium, molybdenum, technetium, ruthenium, rhodium, palladium, silver, cadmium, hafnium, tantalum, tungsten, rhenium, osmium, iridium, platinum, gold, mercury, rutherfordium, dubnium, seaborgium, bohrium, hassium, meitnerium, ununnilium, unununium, and ununbium. In one embodiment, a BMG containing a transition metal element can have at least one of Sc, Y, La, Ac, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, and Hg. Depending on the application, any suitable transitional metal elements, or their combinations, can be used. The alloy composition can include multiple transitional metal elements, such as at least two, at least three, at least four, or more, transitional metal elements.

The presently described alloy or alloy "sample" or "specimen" alloy can have any shape or size. For example, the alloy can have a shape of a particulate, which can have a shape such as spherical, ellipsoid, wire-like, rod-like, sheet-like, flake-like, or an irregular shape. The particulate can have any size. For example, it can have an average diameter of between about 1 micron and about 100 microns, such as between about 5 microns and about 80 microns, such as between about 10 microns and about 60 microns, such as between about 15 microns and about 50 microns, such as between about 15 microns and about 45 microns, such as between about 20 microns and about 40 microns, such as between about 25 microns and about 35 microns. For example, in one embodiment, the average diameter of the particulate is between about 25 microns and about 44 microns. In some embodiments, smaller particulates, such as those in the nanometer range, or larger particulates, such as those bigger than 100 microns, can be used.

The alloy sample or specimen can also be of a much larger dimension. For example, it can be a bulk structural component, such as an ingot, housing/casing of an electronic device or even a portion of a structural component that has dimensions in the millimeter, centimeter, or meter range.

Solid Solution

The term "solid solution" refers to a solid form of a solution. The term "solution" refers to a mixture of two or more substances, which may be solids, liquids, gases, or a combination of these. The mixture can be homogeneous or heterogeneous. The term "mixture" is a composition of two or more substances that are combined with each other and are generally capable of being separated. Generally, the two or more substances are not chemically combined with each other.

Alloy

In some embodiments, the alloy composition described herein can be fully alloyed. In one embodiment, an "alloy" refers to a homogeneous mixture or solid solution of two or more metals, the atoms of one replacing or occupying interstitial positions between the atoms of the other; for example, brass is an alloy of zinc and copper. An alloy, in contrast to a composite, can refer to a partial or complete solid solution of one or more elements in a metal matrix, such as one or more compounds in a metallic matrix. The term alloy herein can refer to both a complete solid solution alloy that can give single solid phase microstructure and a partial solution that can give two or more phases. An alloy composition described herein can refer to one comprising an alloy or one comprising an alloy-containing composite.

Thus, a fully alloyed alloy can have a homogenous distribution of the constituents, be it a solid solution phase, a compound phase, or both. The term "fully alloyed" used herein can account for minor variations within the error tolerance. For example, it can refer to at least 90% alloyed, such as at least 95% alloyed, such as at least 99% alloyed, such as at least 99.5% alloyed, such as at least 99.9% alloyed. The percentage herein can refer to either volume percent or weight percentage, depending on the context. These percentages can be balanced by impurities, which can be in terms of composition or phases that are not a part of the alloy.

Amorphous or Non-Crystalline Solid

An "amorphous" or "non-crystalline solid" is a solid that lacks lattice periodicity, which is characteristic of a crystal. As used herein, an "amorphous solid" includes "glass" which is an amorphous solid that softens and transforms into a liquid-like state upon heating through the glass transition. Generally, amorphous materials lack the long-range order characteristic of a crystal, though they can possess some short-range order at the atomic length scale due to the nature of chemical bonding. The distinction between amorphous solids and crystalline solids can be made based on lattice periodicity as determined by structural characterization techniques such as x-ray diffraction and transmission electron microscopy.

The terms "order" and "disorder" designate the presence or absence of some symmetry or correlation in a manyparticle system. The terms "long-range order" and "short-range order" distinguish order in materials based on length scales.

The strictest form of order in a solid is lattice periodicity: a certain pattern (the arrangement of atoms in a unit cell) is repeated again and again to form a translationally invariant tiling of space. This is the defining property of a crystal. Possible symmetries have been classified in 14 Bravais lattices and 230 space groups.

Lattice periodicity implies long-range order. If only one unit cell is known, then by virtue of the translational symmetry it is possible to accurately predict all atomic positions at arbitrary distances. The converse is generally true, except, for example, in quasi-crystals that have perfectly deterministic tilings but do not possess lattice periodicity.

Long-range order characterizes physical systems in which remote portions of the same sample exhibit correlated behavior. This can be expressed as a correlation function, namely the spin-spin correlation function: $G(x, x')=\langle s(x), s(x')\rangle$.

In the above function, s is the spin quantum number and x is the distance function within the particular system. This function is equal to unity when $x=x'$ and decreases as the distance $|x-x'|$ increases. Typically, it decays exponentially to zero at large distances, and the system is considered to be disordered. If, however, the correlation function decays to a constant value at large $|x-x'|$, then the system can be said to possess long-range order. If it decays to zero as a power of the distance, then it can be called quasi-long-range order. Note that what constitutes a large value of $|x-x'|$ is relative.

A system can be said to present quenched disorder when some parameters defining its behavior are random variables that do not evolve with time (i.e., they are quenched or frozen)—e.g., spin glasses. It is opposite to annealed disorder, where the random variables are allowed to evolve themselves. Embodiments herein include systems comprising quenched disorder.

The alloy described herein can be crystalline, partially crystalline, amorphous, or substantially amorphous. For example, the alloy sample/specimen can include at least some crystallinity, with grains/crystals having sizes in the nanometer and/or micrometer ranges. Alternatively, the alloy can be substantially amorphous, such as fully amorphous. In one embodiment, the alloy composition is at least substantially not amorphous, such as being substantially crystalline, such as being entirely crystalline.

In one embodiment, the presence of a crystal or a plurality of crystals in an otherwise amorphous alloy can be construed as a "crystalline phase" therein. The degree of crystallinity (or "crystallinity" for short in some embodiments) of an alloy can refer to the amount of the crystalline phase present in the alloy. The degree can refer to, for example, a fraction of crystals present in the alloy. The fraction can refer to volume fraction or weight fraction, depending on the context. A measure of how "amorphous" an amorphous alloy is can be amorphicity. Amorphicity can be measured in terms of a degree of crystallinity. For example, in one embodiment, an alloy having a low degree of crystallinity can be said to have a high degree of amorphicity. In one embodiment, for example, an alloy having 60 vol % crystalline phase can have a 40 vol % amorphous phase.

Amorphous Alloy or Amorphous Metal

An "amorphous alloy" is an alloy having an amorphous content of more than 50% by volume, preferably more than 90% by volume of amorphous content, more preferably more than 95% by volume of amorphous content, and most preferably more than 99% to almost 100% by volume of amorphous content. Note that, as described above, an alloy high in amorphicity is equivalently low in degree of crystallinity. An "amorphous metal" is an amorphous metal material with a disordered atomic-scale structure. In contrast to most metals, which are crystalline and therefore have a highly ordered arrangement of atoms, amorphous alloys are non-crystalline. Materials in which such a disordered structure is produced directly from the liquid state during cooling are sometimes referred to as "glasses." Accordingly, amorphous metals are commonly referred to as "metallic glasses" or "glassy metals." In one embodiment, a bulk metallic glass ("BMG") can refer to an alloy, of which the microstructure is at least partially amorphous. However, there are several ways besides extremely rapid cooling to produce amorphous metals, including physical vapor deposition, solid-state reaction, ion irradiation, melt spinning, and mechanical alloying. Amorphous alloys can be a single class of materials, regardless of how they are prepared.

Amorphous metals can be produced through a variety of quick-cooling methods. For instance, amorphous metals can be produced by sputtering molten metal onto a spinning metal disk. The rapid cooling, on the order of millions of degrees a second, can be too fast for crystals to form, and the material is thus "locked in" a glassy state. Also, amorphous metals/alloys can be produced with critical cooling rates low enough to allow formation of amorphous structures in thick layers—e.g., bulk metallic glasses.

The terms "bulk metallic glass" ("BMG"), bulk amorphous alloy ("BAA"), and bulk solidifying amorphous alloy are used interchangeably herein. They refer to amorphous alloys having the smallest dimension at least in the millimeter range. For example, the dimension can be at least about 0.5 mm, such as at least about 1 mm, such as at least about 2 mm, such as at least about 4 mm, such as at least about 5 mm, such as at least about 6 mm, such as at least about 8 mm, such as at least about 10 mm, such as at least about 12 mm. Depending on the geometry, the dimension can refer to the diameter, radius, thickness, width, length, etc. A BMG can also be a metallic glass having at least one dimension in the centimeter range, such as at least about 1.0 cm, such as at least about 2.0 cm, such as at least about 5.0 cm, such as at least about 10.0 cm. In some embodiments, a BMG can have at least one dimension at least in the meter range. A BMG can take any of the shapes or forms described above, as related to a metallic glass. Accordingly, a BMG described herein in some embodiments can be different from a thin film made by a conventional deposition technique in one important aspect—the former can be of a much larger dimension than the latter.

Amorphous metals can be an alloy rather than a pure metal. The alloys may contain atoms of significantly different sizes, leading to low free volume (and therefore having viscosity up to orders of magnitude higher than other metals and alloys) in a molten state. The viscosity prevents the atoms from moving enough to form an ordered lattice. The material structure may result in low shrinkage during cooling and resistance to plastic deformation. The absence of grain boundaries, the weak spots of crystalline materials in some cases, may, for example, lead to better resistance to wear and corrosion. In one embodiment, amorphous metals, while technically glasses, may also be much tougher and less brittle than oxide glasses and ceramics.

Thermal conductivity of amorphous materials may be lower than that of their crystalline counterparts. To achieve formation of an amorphous structure even during slower cooling, the alloy may be made of three or more components, leading to complex crystal units with higher potential energy and lower probability of formation. The formation of amorphous alloy can depend on several factors: the composition of the components of the alloy; the atomic radius of the components (preferably with a significant difference of over 12% to achieve high packing density and low free volume); and the negative heat of mixing the combination of components, inhibiting crystal nucleation and prolonging the time the molten metal stays in a supercooled state. However, as the formation of an amorphous alloy is based on many different variables, it can be difficult to make a prior determination of whether an alloy composition would form an amorphous alloy.

Amorphous alloys, for example, of boron, silicon, phosphorus, and other glass formers with magnetic metals (iron, cobalt, nickel) may be magnetic, with low coercivity and high electrical resistance. The high resistance leads to low losses by eddy currents when subjected to alternating magnetic fields, a property useful, for example, as transformer magnetic cores.

Amorphous alloys may have a variety of potentially useful properties. In particular, they tend to be stronger than crystalline alloys of similar chemical composition, and they can sustain larger reversible ("elastic") deformations than crystalline alloys. Amorphous metals derive their strength directly from their non-crystalline structure, which can have none of the defects (such as dislocations) that limit the strength of crystalline alloys. For example, one modern amorphous metal, known as Vitreloy™, has a tensile strength that is almost twice that of high-grade titanium. In some embodiments, metallic glasses at room temperature are not ductile and tend to fail suddenly when loaded in tension, which limits the material applicability in reliability-critical applications, as the impending failure is not evident. Therefore, to overcome this challenge, metal matrix composite materials having a metallic glass matrix containing dendritic particles or fibers of a ductile crystalline metal can be used. Alternatively, a BMG low in element(s) that tend to cause embitterment (e.g., Ni) can be used. For example, a Ni-free BMG can be used to improve the ductility of the BMG.

Another useful property of bulk amorphous alloys is that they can be true glasses; in other words, they can soften and flow upon heating. This can allow for easy processing, such as by injection molding, in much the same way as polymers. As a result, amorphous alloys can be used for making sports equipment, medical devices, electronic components and equipment, and thin films. Thin films of amorphous metals can be deposited as protective coatings via a high velocity oxygen fuel technique.

A material can have an amorphous phase, a crystalline phase, or both. The amorphous and crystalline phases can have the same chemical composition and differ only in the microstructure—i.e., one amorphous and the other crystalline. Microstructure in one embodiment refers to the structure of a material as revealed by a microscope at 25× magnification or higher. Alternatively, the two phases can have different chemical compositions and microstructures. For example, a composition can be partially amorphous, substantially amorphous, or completely amorphous.

As described above, the degree of amorphicity (and conversely the degree of crystallinity) can be measured by fraction of crystals present in the alloy. The degree can refer to volume fraction of weight fraction of the crystalline phase present in the alloy. A partially amorphous composition can refer to a composition of at least about 5 vol % of which is of an amorphous phase, such as at least about 10 vol %, such as at least about 20 vol %, such as at least about 40 vol %, such as at least about 60 vol %, such as at least about 80 vol %, such as at least about 90 vol %. The terms "substantially" and "about" have been defined elsewhere in this application. Accordingly, a composition that is at least substantially amorphous can refer to one of which at least about 90 vol % is amorphous, such as at least about 95 vol %, such as at least about 98 vol %, such as at least about 99 vol %, such as at least about 99.5 vol %, such as at least about 99.8 vol %, such as at least about 99.9 vol %. In one embodiment, a substantially amorphous composition can have some incidental, insignificant amount of crystalline phase present therein.

In one embodiment, an amorphous alloy composition can be homogeneous with respect to the amorphous phase. A substance that is uniform in composition is homogeneous. This is in contrast to a substance that is heterogeneous. The term "composition" refers to the chemical composition and/or microstructure in the substance. A substance is homogeneous when a volume of the substance is divided in half and both halves have substantially the same composition. For example, a particulate suspension is homogeneous when a volume of the particulate suspension is divided in half and both halves have substantially the same volume of particles. However, it might be possible to see the individual particles under a microscope. Another example of a homogeneous substance is air where different ingredients therein are equally suspended, though the particles, gases and liquids in air can be analyzed separately or separated from air.

A composition that is homogeneous with respect to an amorphous alloy can refer to one having an amorphous phase substantially uniformly distributed throughout its microstructure. In other words, the composition macroscopically includes a substantially uniformly distributed amorphous alloy throughout the composition. In an alternative embodiment, the composition can be of a composite, having an amorphous phase having therein a non-amorphous phase. The non-amorphous phase can be a crystal or a plurality of crystals. The crystals can be in the form of particulates of any shape, such as spherical, ellipsoid, wire-like, rod-like, sheet-like, flake-like, or an irregular shape. In one embodiment, it can have a dendritic form. For example, an at least partially amorphous composite composition can have a crystalline phase in the shape of dendrites dispersed in an amorphous phase matrix; the dispersion can be uniform or non-uniform, and the amorphous phase and the crystalline phase can have the same or a different chemical composition. In one embodiment, they have substantially the same chemical composition. In another embodiment, the crystalline phase can be more ductile than the BMG phase.

The methods described herein can be applicable to any type of amorphous alloy. Similarly, the amorphous alloy described herein as a constituent of a composition or article can be of any type. The amorphous alloy can include the element Zr, Hf, Ti, Cu, Ni, Pt, Pd, Fe, Mg, Au, La, Ag, Al, Mo, Nb, Be, or combinations thereof. Namely, the alloy can include any combination of these elements in its chemical formula or chemical composition. The elements can be present at different weight or volume percentages. For example, an iron "based" alloy can refer to an alloy having a non-insignificant weight percentage of iron present therein, the weight percent can be, for example, at least about 20 wt %, such as at least about 40 wt %, such as at least about 50 wt %, such as at least about 60 wt %, such as at least about 80 wt %. Alternatively, in one embodiment, the above-described percentages can be volume percentages, instead of weight percentages. Accordingly, an amorphous alloy can be zirconium-based, titanium-based, platinum-based, palladium-based, gold-based, silver-based, copper-based, iron-based, nickel-based, aluminum-based, molybdenum-based, and the like. The alloy can also be free of any of the aforementioned elements to suit a particular purpose. For example, in some embodiments, the alloy, or the composition including the alloy, can be substantially free of nickel, aluminum, titanium, beryllium, or combinations thereof. In one embodiment, the alloy or the composite is completely free of nickel, aluminum, titanium, beryllium, or combinations thereof.

For example, the amorphous alloy can have the formula $(Zr, Ti)_a(Ni, Cu, Fe)_b(Be, Al, Si, B)_c$, wherein a, b, and c each represents a weight or atomic percentage. In one embodiment, a is in the range of from 30 to 75, b is in the range of from 5 to 60, and c is in the range of from 0 to 50 in atomic percentages. Alternatively, the amorphous alloy can have the formula $(Zr, Ti)_a(Ni, Cu)_b(Be)_c$, wherein a, b, and c each represents a weight or atomic percentage. In one embodiment, a is in the range of from 40 to 75, b is in the range of from 5 to 50, and c is in the range of from 5 to 50 in atomic percentages. The alloy can also have the formula $(Zr, Ti)_a(Ni, Cu)_b(Be)_c$, wherein a, b, and c each represents a weight or atomic percentage. In one embodiment, a is in the range of from 45 to 65, b is in the range of from 7.5 to 35, and c is in the range of from 10 to 37.5 in atomic percentages. Alternatively, the alloy can have the formula $(Zr)_a(Nb, Ti)_b(Ni, Cu)_c(Al)_d$, wherein a, b, c, and d each represents a weight or atomic percentage. In one embodiment, a is in the range of from 45 to 65, b is in the range of from 0 to 10, c is in the range of from 20 to 40 and d is in the range of from 7.5 to 15 in atomic percentages. One exemplary embodiment of the aforedescribed alloy system is a Zr—Ti—Ni—Cu—Be based amorphous alloy under the trade name Vitreloy™, such as Vitreloy-1 and Vitreloy-101, as fabricated by Liquidmetal Technologies, CA, USA. Some examples of amorphous alloys of the different systems are provided in Table 1 and Table 2.

TABLE 1

Exemplary amorphous alloy compositions

| Alloy | Atm % | Atm % | Atm % | Atm % | Atm % | Atm % | Atm % | Atm % |
|---|---|---|---|---|---|---|---|---|
| 1 | Fe | Mo | Ni | Cr | P | C | B | |
| | 68.00% | 5.00% | 5.00% | 2.00% | 12.50% | 5.00% | 2.50% | |
| 2 | Fe | Mo | Ni | Cr | P | C | B | Si |
| | 68.00% | 5.00% | 5.00% | 2.00% | 11.00% | 5.00% | 2.50% | 1.50% |
| 3 | Pd | Cu | Co | P | | | | |
| | 44.48% | 32.35% | 4.05% | 19.11% | | | | |
| 4 | Pd | Ag | Si | P | | | | |
| | 77.50% | 6.00% | 9.00% | 7.50% | | | | |
| 5 | Pd | Ag | Si | P | Ge | | | |
| | 79.00% | 3.50% | 9.50% | 6.00% | 2.00% | | | |
| 6 | Pt | Cu | Ag | P | B | Si | | |
| | 74.70% | 1.50% | 0.30% | 18.0% | 4.00% | 1.50% | | |

TABLE 2

Additional Exemplary amorphous alloy compositions (atomic %)

| Alloy | Atm % | Atm % | Atm % | Atm % | Atm % | Atm % |
|---|---|---|---|---|---|---|
| 1 | Zr | Ti | Cu | Ni | Be | |
| | 41.20% | 13.80% | 12.50% | 10.00% | 22.50% | |
| 2 | Zr | Ti | Cu | Ni | Be | |
| | 44.00% | 11.00% | 10.00% | 10.00% | 25.00% | |
| 3 | Zr | Ti | Cu | Ni | Nb | Be |
| | 56.25% | 11.25% | 6.88% | 5.63% | 7.50% | 12.50% |
| 4 | Zr | Ti | Cu | Ni | Al | Be |
| | 64.75% | 5.60% | 14.90% | 11.15% | 2.60% | 1.00% |
| 5 | Zr | Ti | Cu | Ni | Al | |
| | 52.50% | 5.00% | 17.90% | 14.60% | 10.00% | |
| 6 | Zr | Nb | Cu | Ni | Al | |
| | 57.00% | 5.00% | 15.40% | 12.60% | 10.00% | |
| 7 | Zr | Cu | Ni | Al | | |
| | 50.75% | 36.23% | 4.03% | 9.00% | | |
| 8 | Zr | Ti | Cu | Ni | Be | |
| | 46.75% | 8.25% | 7.50% | 10.00% | 27.50% | |
| 9 | Zr | Ti | Ni | Be | | |
| | 21.67% | 43.33% | 7.50% | 27.50% | | |
| 10 | Zr | Ti | Cu | Be | | |
| | 35.00% | 30.00% | 7.50% | 27.50% | | |
| 11 | Zr | Ti | Co | Be | | |
| | 35.00% | 30.00% | 6.00% | 29.00% | | |
| 12 | Zr | Ti | Fe | Be | | |
| | 35.00% | 30.00% | 2.00% | 33.00% | | |
| 13 | Au | Ag | Pd | Cu | Si | |
| | 49.00% | 5.50% | 2.30% | 26.90% | 16.30% | |
| 14 | Au | Ag | Pd | Cu | Si | |
| | 50.90% | 3.00% | 2.30% | 27.80% | 16.00% | |
| 15 | Pt | Cu | Ni | P | | |
| | 57.50% | 14.70% | 5.30% | 22.50% | | |
| 16 | Zr | Ti | Nb | Cu | Be | |
| | 36.60% | 31.40% | 7.00% | 5.90% | 19.10% | |
| 17 | Zr | Ti | Nb | Cu | Be | |
| | 38.30% | 32.90% | 7.30% | 6.20% | 15.30% | |
| 18 | Zr | Ti | Nb | Cu | Be | |
| | 39.60% | 33.90% | 7.60% | 6.40% | 12.50% | |
| 19 | Cu | Ti | Zr | Ni | | |
| | 47.00% | 34.00% | 11.00% | 8.00% | | |
| 20 | Zr | Co | Al | | | |
| | 55.00% | 25.00% | 20.00% | | | |

Other exemplary ferrous metal-based alloys include compositions such as those disclosed in U.S. Patent Application Publication Nos. 2007/0079907 and 2008/0305387. These compositions include the Fe(Mn, Co, Ni, Cu) (C, Si, B, P, Al) system, wherein the Fe content is from 60 to 75 atomic percentage, the total of (Mn, Co, Ni, Cu) is in the range of from 5 to 25 atomic percentage, and the total of (C, Si, B, P, Al) is in the range of from 8 to 20 atomic percentage, as well as the exemplary composition Fe48Cr15Mo14Y2C15B6. They also include the alloy systems described by Fe—Cr—Mo—(Y,Ln)-C—B, Co—Cr—Mo-Ln-C—B, Fe—Mn—Cr—Mo—(Y,Ln)-C—B, (Fe, Cr, Co)—(Mo,Mn)—(C,B)—Y, Fe—(Co,Ni)—(Zr,Nb,Ta)—(Mo,W)—B, Fe—(Al,Ga)—(P,C,B,Si,Ge), Fe—(Co,Cr,Mo, Ga,Sb)—P—B—C, (Fe,Co)—B—Si—Nb alloys, and Fe—

(Cr—Mo)—(C,B)—Tm, where Ln denotes a lanthanide element and Tm denotes a transition metal element. Furthermore, the amorphous alloy can also be one of the exemplary compositions Fe80P12.5C5B2.5, Fe80P11C5B2.5Si1.5, Fe74.5Mo5.5P12.5C5B2.5, Fe74.5Mo5.5P11C5B2.5Si1.5, Fe70Mo5Ni5P12.5C5B2.5, Fe70Mo5Ni5P11C5B2.5Si1.5, Fe68Mo5Ni5Cr2P12.5C5B2.5, and Fe68Mo5Ni5Cr2P11C5B2.5Si1.5, described in U.S. Patent Application Publication No. 2010/0300148.

The amorphous alloys can also be ferrous alloys, such as (Fe, Ni, Co) based alloys. Examples of such compositions are disclosed in U.S. Pat. Nos. 6,325,868; 5,288,344; 5,368,659; 5,618,359; and 5,735,975, Inoue et al., Appl. Phys. Lett., Volume 71, p 464 (1997), Shen et al., Mater. Trans., JIM, Volume 42, p 2136 (2001), and Japanese Patent Application No. 200126277 (Pub. No. 2001303218 A). One exemplary composition is $Fe_{72}Al_5Ga_2P_{11}C_6B_4$. Another example is $Fe_{72}Al_7Zr_{10}Mo_5W_2B_{15}$. Another iron-based alloy system that can be used in the coating herein is disclosed in U.S. Patent Application Publication No. 2010/0084052, wherein the amorphous metal contains, for example, manganese (1 to 3 atomic %), yttrium (0.1 to 10 atomic %), and silicon (0.3 to 3.1 atomic %) in the range of composition given in parentheses; and that contains the following elements in the specified range of composition given in parentheses: chromium (15 to 20 atomic %), molybdenum (2 to 15 atomic %), tungsten (1 to 3 atomic %), boron (5 to 16 atomic %), carbon (3 to 16 atomic %), and the balance iron.

The amorphous alloy can also be one of the Pt- or Pd-based alloys described by U.S. Patent Application Publication Nos. 2008/0135136, 2009/0162629, and 2010/0230012. Exemplary compositions include Pd44.48Cu32.35Co4.05P19.11, Pd77.5Ag6Si9P7.5, and Pt74.7Cu1.5Ag0.3P18B4Si1.5.

The aforedescribed amorphous alloy systems can further include additional elements, such as additional transition metal elements, including Nb, Cr, V, and Co. The additional elements can be present at less than or equal to about 30 wt %, such as less than or equal to about 20 wt %, such as less than or equal to about 10 wt %, such as less than or equal to about 5 wt %. In one embodiment, the additional, optional element is at least one of cobalt, manganese, zirconium, tantalum, niobium, tungsten, yttrium, titanium, vanadium and hafnium to form carbides and further improve wear and corrosion resistance. Further optional elements may include phosphorous, germanium and arsenic, totaling up to about 2%, and preferably less than 1%, to reduce melting point. Otherwise incidental impurities should be less than about 2% and preferably 0.5%.

In some embodiments, a composition having an amorphous alloy can include a small amount of impurities. The impurity elements can be intentionally added to modify the properties of the composition, such as improving the mechanical properties (e.g., hardness, strength, fracture mechanism, etc.) and/or improving the corrosion resistance. Alternatively, the impurities can be present as inevitable, incidental impurities, such as those obtained as a byproduct of processing and manufacturing. The impurities can be less than or equal to about 10 wt %, such as about 5 wt %, such as about 2 wt %, such as about 1 wt %, such as about 0.5 wt %, such as about 0.1 wt %. In some embodiments, these percentages can be volume percentages instead of weight percentages. In one embodiment, the alloy sample/composition consists essentially of the amorphous alloy (with only a small incidental amount of impurities). In another embodiment, the composition includes the amorphous alloy (with no observable trace of impurities).

In one embodiment, the final parts exceeded the critical casting thickness of the bulk solidifying amorphous alloys.

In embodiments herein, the existence of a supercooled liquid region in which the bulk-solidifying amorphous alloy can exist as a high viscous liquid allows for superplastic forming. Large plastic deformations can be obtained. The ability to undergo large plastic deformation in the supercooled liquid region is used for the forming and/or cutting process. As oppose to solids, the liquid bulk solidifying alloy deforms locally which drastically lowers the required energy for cutting and forming. The ease of cutting and forming depends on the temperature of the alloy, the mold, and the cutting tool. As higher is the temperature, the lower is the viscosity, and consequently easier is the cutting and forming.

Embodiments herein can utilize a thermoplastic-forming process with amorphous alloys carried out between Tg and Tx, for example. Herein, Tx and Tg are determined from standard DSC measurements at typical heating rates (e.g. 20° C./min) as the onset of crystallization temperature and the onset of glass transition temperature.

The amorphous alloy components can have the critical casting thickness and the final part can have thickness that is thicker than the critical casting thickness. Moreover, the time and temperature of the heating and shaping operation is selected such that the elastic strain limit of the amorphous alloy could be substantially preserved to be not less than 1.0%, and preferably not being less than 1.5%. In the context of the embodiments herein, temperatures around glass transition means the forming temperatures can be below glass transition, at or around glass transition, and above glass transition temperature, but preferably at temperatures below the crystallization temperature $T_x$. The cooling step is carried out at rates similar to the heating rates at the heating step, and preferably at rates greater than the heating rates at the heating step. The cooling step is also achieved preferably while the forming and shaping loads are still maintained.

Electronic Devices

The embodiments herein can be valuable in the fabrication of electronic devices using a BMG. An electronic device herein can refer to any electronic device known in the art. For example, it can be a telephone, such as a cell phone, and a land-line phone, or any communication device, such as a smart phone, including, for example an iPhone™, and an electronic email sending/receiving device. It can be a part of a display, such as a digital display, a TV monitor, an electronic-book reader, a portable web-browser (e.g., iPad™), and a computer monitor. It can also be an entertainment device, including a portable DVD player, conventional DVD player, Blu-Ray disk player, video game console, music player, such as a portable music player (e.g., iPod™), etc. It can also be a part of a device that provides control, such as controlling the streaming of images, videos, sounds (e.g., Apple TV™), or it can be a remote control for an electronic device. It can be a part of a computer or its accessories, such as the hard drive tower housing or casing, laptop housing, laptop keyboard, laptop track pad, desktop keyboard, mouse, and speaker. The article can also be applied to a device such as a watch or a clock.

A proposed solution according to embodiments herein for melting materials (e.g., metals or metal alloys) in a vessel is to contain the melt or molten material within melt zone.

Embodiments relate to apparatus and methods to control the position and shape of melting feedstock in an inline melting apparatus using an induction coil with separated portions of helical turns. The induction coil has a first section acting as a melting coil and second section acting as a containment coil. Laplace forces generated by the "containment" coil act against those generated by the melt coil (which tend to push meltable material or alloy out of a vessel) without substantially reducing the inductive heating of the meltable material. This allows the material to be melted and controllably introduced into another system such as a cold chamber die caster for subsequent forming. It also allows the material to be electromagnetically contained without using a physical obstruction to contain the material.

Figure 2:
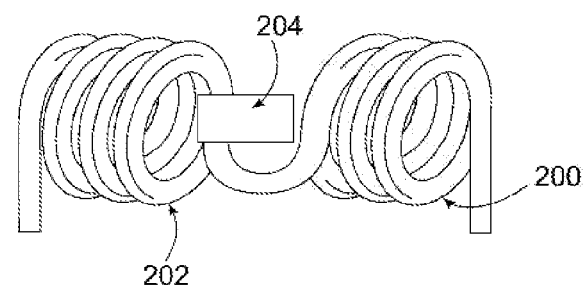
FIG. 2 shows a schematic drawing showing an exemplary embodiment of an arrangement of a first induction coil and a second induction coil for melting and containment of a material.

FIG. 2 shows an embodiment of the induction coil. The apparatus could include a vessel configured to receive a material such as an ingot 204 shown in FIG. 2 for melting therein. Shown are a first induction coil, configured to melt the material therein; and a second induction coil, positioned in line with the first induction coil, the second induction coil configured to melt as well as contain movement the material. The first section or first induction coil and the second section or second induction coil are part of a single induction coil that are operatively connected and configured to operate at the same frequency. The first section and the second section are positioned relatively away from each other along an axis of the vessel such that a space is formed therebetween. The induction coil imposes forces on the molten material in the vessel within the space between the first and second sections of the coil during its operation (e.g., during RF application). Accordingly, FIG. 2 shows a coil configuration that performs both heating and containment functions. In operation, the melt temperature and stirring remains relatively uniform in the region between the first and second coils. The second induction coil can be configured to function as a gate or a valve for containing movement of the molten material in a horizontal direction within the vessel. In one embodiment, the first induction coil 200 is a load or heating coil and the second induction coil 202 is a containing coil. Alternatively, in another embodiment, the first induction coil is a containing coil and the second induction coil is a heating coil. The single induction coil can have its frequency tuned to maximize both thermal energy generation on a meltable material (e.g., in the form of an ingot) as well as maximize forces applied to the melt.

For explanatory purposes only, it should be understood that FIG. 2 references injection of molten material into a mold in a horizontal direction, out of a vessel, from right to left. Accordingly, in these illustrative embodiments, first induction coil is a heating coil and second induction coil is a containing coil. However, the direction of movement and the heating/containing coil assignments are not meant to be limiting. The apparatus could further include an additional induction coil located at either an ejection end of the vessel or an opposite side of the ejection end of the vessel. An additional induction coil is not shown in FIG. 2.

The vessel (not shown in FIG. 2, but instead an ingot within the vessel is shown) could be positioned along a horizontal axis of the first induction coil or the second induction such that movement of the material in the vessel is in a horizontal direction along an ejection path of the vessel.

In an embodiment, the meltable material is contained on its bottom by a water-cooled boat, vessel, or container, that may or may not have a substantially U-shaped channel.

In any of these embodiments, the material for melting could include a BMG feedstock, and the apparatus is configured to mold the material into a BMG part.

In accordance with various embodiments, there is provided an apparatus. The apparatus may include a vessel configured to receive a material for melting therein; and a first induction coil and a second induction coil configured to melt and contain movement of the material in the vessel. The first induction coil and the second induction coil are a single induction coil. The apparatus can be configured to form the material into a BMG part.

In accordance with various embodiments, there is provided a method of melting a material. The method includes: inserting meltable material into a vessel; and operating an induction coil at an RF frequency to form molten material. The induction coil has a first induction coil and a second induction coil configured to melt and contain the meltable material in the vessel.

In accordance with various embodiments, there is provided a method of operating an apparatus. The method includes: inserting meltable material into a vessel; operating an induction coil at an RF frequency to form molten material in the vessel; and stopping operation of the induction coil. The induction coil has a first induction coil and a second induction coil configured to melt and contain the meltable material in the vessel.

In accordance with various embodiments, there is provided a method of operating an apparatus. The method includes: inserting meltable material into a vessel; operating an induction coil at an RF frequency to form molten material in the vessel; and stopping operation of the induction coil. The induction coil has a first section and a second section that are operatively connected. The first section and the second section are positioned relatively away from each other along an axis of the vessel such that a space is formed therebetween. The induction coil imposes forces on the molten material in the vessel within the space between the first and second sections of the coil during operation.

In accordance with various embodiments, an apparatus is provided. The apparatus may include a vessel configured to receive a material for melting therein and an induction coil positioned substantially around the vessel. The induction coil has multiple coil turns configured to operate at an RF frequency to form molten material in the vessel. The induction coil is separated into a first section and a second section and has at least one turn between the first section and the second section. The at least one turn is spaced a distance from both of the first section and the second section.

The methods, techniques, and devices illustrated herein are not intended to be limited to the illustrated embodiments. As disclosed herein, an apparatus or a system (or a device or a machine) is configured to perform melting of and injection molding of material(s) (such as amorphous alloys). The apparatus is configured to process such materials or alloys by melting at higher melting temperatures before injecting the molten material into a mold for molding. As further described below, parts of the apparatus are positioned in-line with each other. In accordance with embodiments, parts of the apparatus (or access thereto) and/or the apparatus or system itself are aligned on a horizontal axis.

In an embodiment, parts of the apparatus and/or the apparatus or system itself are aligned at an angle relative to a horizontal axis. A vessel can be tilted at an angle such that material being melted by the herein disclosed induction coil or that is molten therein is affected by gravity. For example, a vessel can be positioned diagonally at an acute angle relative to a horizontal and longitudinal direction of the system, such that an injection end (e.g., left side in the Figures) of the vessel is higher than or positioned upwardly relative to a plunger end (e.g., right side in the Figures) of the vessel. The angled position of the vessel may help contain the molten material (along with the coil and its design) by reduce spilling out of molten material before injection [into the mold].

The following embodiments are for illustrative purposes only and are not meant to be limiting.

Figure 3:
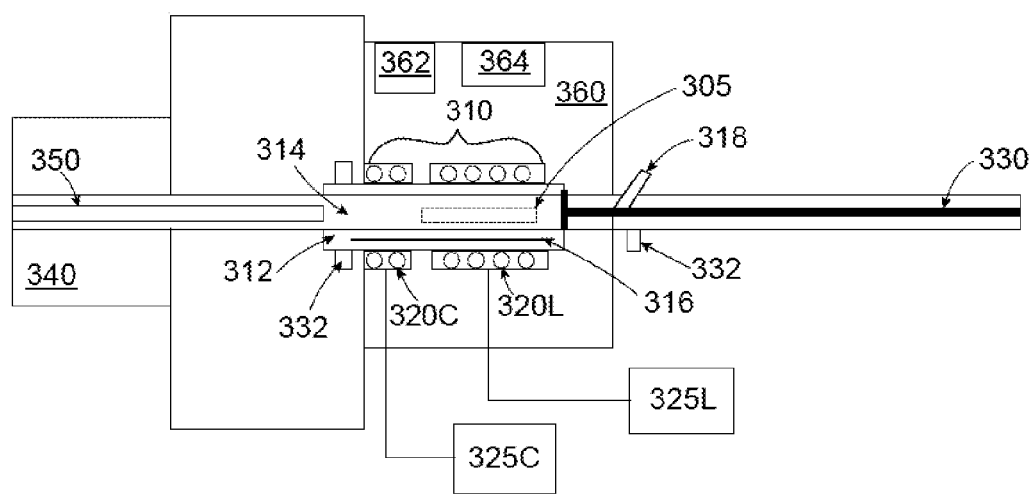
FIG. 3 shows a schematic diagram of an exemplary injection molding system/apparatus in accordance with various embodiments of the present teachings.

FIG. 3 illustrates a schematic diagram of an exemplary apparatus for implementing the disclosed embodiments of the induction coil. More specifically, FIG. 3 illustrates an injection molding apparatus 300. In accordance with an embodiment, injection molding system 300 can include a melt zone 310 configured to melt meltable material 305 received therein, and at least one plunger rod 330 configured to eject molten material 305 from melt zone 310 and into a mold 340. In an embodiment, at least plunger rod 330 and melt zone 310 are provided in-line and on a horizontal axis (e.g., X axis), such that plunger rod 330 is moved in a horizontal direction (e.g., along the X-axis) substantially through melt zone 310 to move the molten material 305 into mold 340. The mold can be positioned adjacent to the melt zone.

The meltable material can be received in the melt zone in any number of forms. For example, the meltable material may be provided into melt zone 310 in the form of an ingot (solid state), a semi-solid state, a slurry that is preheated, powder, pellets, etc. In some embodiments, a loading port (such as the illustrated example of an ingot loading port 318) may be provided as part of injection molding apparatus 300. Loading port 318 can be a separate opening or area that is provided within the machine at any number of places. In an embodiment, loading port 318 may be a pathway through one or more parts of the machine. For example, the material (e.g., ingot) may be inserted in a horizontal direction into the vessel 312 by plunger 330, or may be inserted in a horizontal direction from the mold side of the injection apparatus 300 (e.g., through mold 340 and/or through a transfer sleeve 350 into vessel 312). In other embodiments, the meltable material can be provided into melt zone 310 in other manners and/or using other devices (e.g., through an opposite end of the injection apparatus).

Melt zone 310 includes a melting mechanism configured to receive meltable material and to hold the material as it is heated to a molten state. The melting mechanism may be in the form of a vessel 312, for example, that has a body for receiving meltable material and configured to melt the material therein. A vessel as used throughout this disclosure is a container made of a material employed for heating substances to high temperatures. For example, in an embodiment, the vessel may be a crucible, such as a boat style crucible, or a skull crucible. In an embodiment, vessel 312 is a cold hearth melting device that is configured to be utilized for meltable material(s) while under a vacuum (e.g., applied by a vacuum device or pump at a vacuum port 332). In one embodiment, described further below, the vessel is a temperature regulated vessel.

Vessel 312 may also have an inlet for inputting material (e.g., feedstock) into a receiving or melting portion 314 of its body. In the embodiments shown in the Figures, the body of vessel 312 may include a substantially U-shaped structure. However, this illustrated shape is not meant to be limiting. Vessel 312 can include any number of shapes or configurations. The body of the vessel has a length and can extend in a longitudinal and horizontal direction, such that molten material is removed horizontally therefrom using plunger 330. For example, the body may include a base with side walls extending vertically therefrom. The material for heating or melting may be received in a melting portion 314 of the vessel. Melting portion 314 is configured to receive meltable material to be melted therein. For example, melting portion 314 has a surface for receiving material. Vessel 312 may receive material (e.g., in the form of an ingot) in its melting portion 314 using one or more devices of an injection apparatus for delivery (e.g., loading port and plunger).

In an embodiment, body and/or its melting portion 314 may include substantially rounded and/or smooth surfaces. For example, a surface of melting portion 314 may be formed in an arc shape. However, the shape and/or surfaces of the body are not meant to be limiting. The body may be an integral structure, or formed from separate parts that are joined or machined together. The body of vessel 312 may be formed from any number of materials (e.g., copper, silver), include one or more coatings, and/or configurations or designs. For example, one or more surfaces may have recesses or grooves therein.

The body of vessel 312 may be configured to receive the plunger rod there-through in a horizontal direction to move the molten material. That is, in an embodiment, the melting mechanism is on the same axis as the plunger rod, and the body can be configured and/or sized to receive at least part of the plunger rod. Thus, plunger rod 330 can be configured to move molten material (after heating/melting) from the vessel by moving substantially through vessel 312, and into mold 340. Referencing the illustrated embodiment of apparatus 300 in FIG. 3, for example, plunger rod 330 would move in a horizontal direction from the right towards the left, through vessel 312, moving and pushing the molten material towards and into mold 340.

To heat melt zone 310 and melt the meltable material received in vessel 312, injection apparatus 300 also includes a heat source that is used to heat and melt the meltable material.

At least melting portion 314 of the vessel, if not substantially the entire body itself, is configured to be heated in melt zone 310 such that the material received therein is melted. Heating is accomplished using, for example, an induction source positioned within melt zone 310 that is configured to melt the meltable material. In an embodiment, induction source has two sections 320L, 320C is positioned adjacent vessel 312 (further described below). For example, induction source may be in the form of a coil positioned in a helical pattern substantially around a length of the vessel body. Accordingly, vessel 312 may be configured to inductively melt a meltable material (e.g., an inserted ingot) within melting portion 314 by supplying power to at least induction source/coil 320L, using a power supply or source 325. Thus, the melt zone 310 can include an induction zone. The induction source is configured to heat up and melt any material that is contained by vessel 312 without melting and wetting vessel 312. The induction coil emits radiofrequency (RF) waves towards vessel 312. As shown in FIG. 3, the coil surrounding vessel 312 may be configured to be positioned in a horizontal direction along a horizontal axis (e.g., X axis).

In one embodiment, the vessel 312 is a temperature regulated vessel. Such a vessel may include one or more temperature regulating channels configured to flow a gas or a liquid (e.g., water, oil, or other fluid) therein for regulating a temperature of the body of vessel 312 during melting of material received in the vessel (e.g., to force cool the vessel). Such a forced-cool crucible can also be provided on the same axis as the plunger rod. The cooling channel(s) can assist in preventing excessive heating and melting of the body of the vessel 312 itself. Cooling channel(s) may be connected to a cooling system configured to induce flow of a gas or a liquid in the vessel. The cooling channel(s) may include one or more inlets and outlets for the fluid to flow there-through. The inlets and outlets of the cooling channels may be configured in any number of ways and are not meant to be limited. For example, cooling channel(s) may be positioned relative to melting portion 314 such that material thereon is melted and the vessel temperature is regulated (i.e., heat is absorbed, and the vessel is cooled). The number, positioning and/or direction of the cooling channel(s) should not be limited. The cooling liquid or fluid may be configured to flow through the cooling channel(s) during melting of the meltable material, when induction source 320L is powered.

After the material is melted in the vessel 312, plunger 330 may be used to force the molten material from the vessel 312 and into a mold 340 for molding into an object, a part or a piece. In instances wherein the meltable material is an alloy, such as an amorphous alloy, the mold 340 is configured to form a molded bulk amorphous alloy object, part, or piece. Mold 340 has an inlet for receiving molten material there-through. An output of the vessel 312 and an inlet of the mold 340 can be provided in-line and on a horizontal axis such that plunger rod 330 is moved in a horizontal direction through body of the vessel to eject molten material and into the mold 340 via its inlet.

As previously noted, systems such as injection molding system 300 that are used to mold materials such as metals or alloys may implement a vacuum when forcing molten material into a mold or die cavity. Injection molding system 300 can further includes at least one vacuum source or pump that is configured to apply vacuum pressure to at least melt zone 310 and mold 340 at vacuum ports 312. The vacuum pressure may be applied to at least the parts of the injection molding system 300 used to melt, move or transfer, and mold the material therein. For example, the vessel 312, transfer sleeve 350, and plunger rod 330 may all be under vacuum pressure and/or enclosed in a vacuum chamber.

In an embodiment, mold 340 is a vacuum mold that is an enclosed structure configured to regulate vacuum pressure therein when molding materials. For example, in an embodiment, vacuum mold 340 includes a first plate (also referred to as an "A" mold or "A" plate), a second plate (also referred to as a "B" mold or "B" plate) positioned adjacently (respectively) with respect to each other. The first plate and second plate generally each have a mold cavity associated therewith for molding melted material there-between. The cavities are configured to mold molten material received there-between via an injection sleeve or transfer sleeve 350. The mold cavities may include a part cavity for forming and molding a part therein.

Generally, the first plate may be connected to transfer sleeve 350. In accordance with an embodiment, plunger rod 330 is configured to move molten material from vessel 312, through a transfer sleeve 350, and into mold 340. Transfer sleeve 350 (sometimes referred to as a shot sleeve, a cold sleeve or an injection sleeve in the art and herein) may be provided between melt zone 310 and mold 340. Transfer sleeve 350 has an opening that is configured to receive and allow transfer of the molten material there-through and into mold 340 (using plunger 330). Its opening may be provided in a horizontal direction along the horizontal axis (e.g., X axis). The transfer sleeve need not be a cold chamber. In an embodiment, at least plunger rod 330, vessel 312 (e.g., its receiving or melting portion), and opening of the transfer sleeve 350 are provided in-line and on a horizontal axis, such that plunger rod 330 can be moved in a horizontal direction through vessel 312 in order to move the molten material into (and subsequently through) the opening of transfer sleeve 350.

Molten material is pushed in a horizontal direction through transfer sleeve 350 and into the mold cavity(ies) via the inlet (e.g., in a first plate) and between the first and second plates. During molding of the material, the at least first and second plates are configured to substantially eliminate exposure of the material (e.g., amorphous alloy) there-between, e.g., to oxygen and nitrogen. Specifically, a vacuum is applied such that atmospheric air is substantially eliminated from within the plates and their cavities. A vacuum pressure is applied to an inside of vacuum mold 340 using at least one vacuum source that is connected via vacuum lines 332. For example, the vacuum pressure or level on the system can be held between $1 \times 10^{-1}$ to $1 \times 10^{-4}$ Torr during the melting and subsequent molding cycle. In another embodiment, the vacuum level is maintained between $1 \times 10^{-2}$ to about $1 \times 10^{-4}$ Torr during the melting and molding process. Of course, other pressure levels or ranges may be used, such as $1 \times 10^{-9}$ Torr to about $1 \times 10^{-3}$ Torr, and/or $1 \times 10^{-3}$ Torr to about 0.1 Torr. An ejector mechanism (not shown) is configured to eject molded (amorphous alloy) material (or the molded part) from the mold cavity between the first and second plates of mold 340. The ejection mechanism is associated with or connected to an actuation mechanism (not shown) that is configured to be actuated in order to eject the molded material or part (e.g., after first and second parts and are moved horizontally and relatively away from each other, after vacuum pressure between at least the plates is released).

Any number or types of molds may be employed in the apparatus 300. For example, any number of plates may be provided between and/or adjacent the first and second plates to form the mold. Molds known in the art as "A" series, "B" series, and/or "X" series molds, for example, may be implemented in injection molding system/apparatus 300.

A uniform heating of the material to be melted and maintenance of temperature of molten material in such an injection molding apparatus 300 assists in forming a uniform molded part. For explanatory purposes only, throughout this disclosure material to be melted is described and illustrated as being in the form of an ingot 305 that is in the form of a solid state feedstock; however, it should be noted that the material to be melted may be received in the injection molding system or apparatus 300 in a solid state, a semi-solid state, a slurry that is preheated, powder, pellets, etc., and that the form of the material is not limiting. In addition, the illustrated view of vessel 312 is a cross-sectional view taken along X-axis of a U-shaped boat/vessel for illustrative purposes only.

In an injection molding apparatus that is positioned inline and in a horizontal direction and to get the most power input into the material for melting, containing the material in the melt zone, adjacent to induction coil, is effective for a consistent melt cycle, rather than, for example, having molten material flow towards and/or out of the ejection path of the vessel. As disclosed herein, the exemplary injection molding apparatus/system 300 in FIG. 3 includes an induction source in the form of a helical coil whose turns are longitudinally separated to act as multiple, separate induction coils, such as, for example, a load induction coil 320L and a containment induction coil 320C, yet are part of a single coil. More specifically, turns of the induction coil 320 are unevenly spaced in such a manner to provide heating as well as load and containment abilities with regards to the material in vessel 312.

Figure 4:
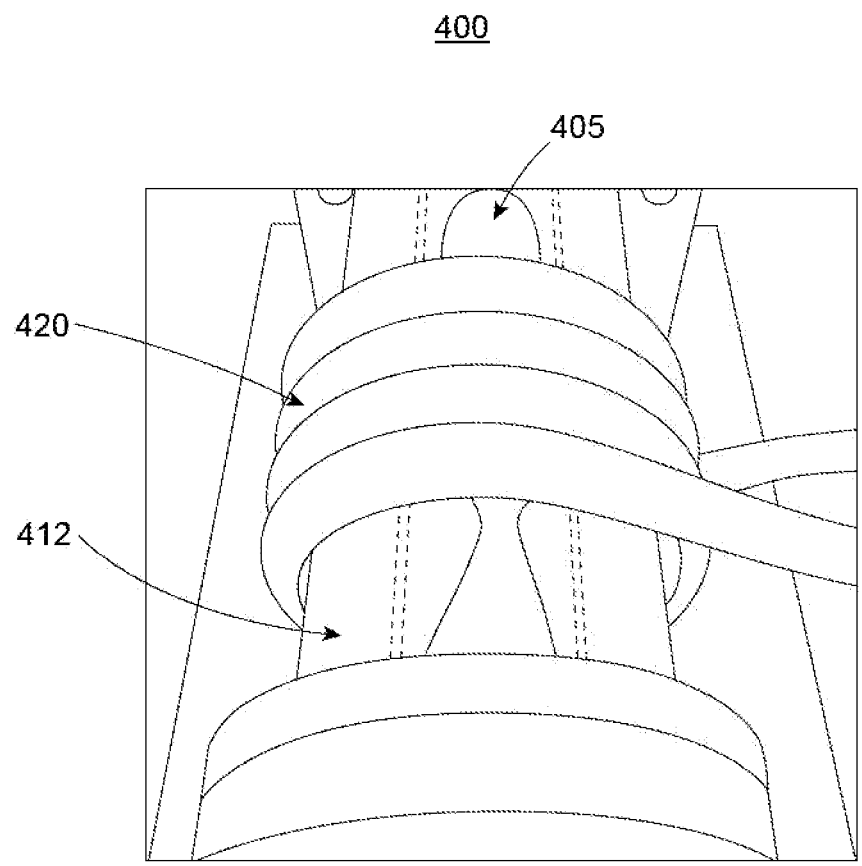
FIG. 4 depicts an induction coil in accordance with an embodiment.

FIG. 4 depicts an embodiment of a vessel 412 and an induction coil 420 having unevenly spaced sections that are configured for use in an injection molding system. The sections of the induction coil 420 may impose forces on the material 405 for melting, e.g., metals/metal alloys, that is placed inside the vessel 412, and ultimately, when the material 405 is molten, the induction coil 420 imposes forces on the molten material 405 within the space between the sections of the coil 420. These forces may act to squeeze the molten material inwards to the center of the vessel, as shown. Meanwhile, these forces may push the molten material 405 out of the induction coil 420 e.g., at the ends of the induction coil 420, while the molten material is being smoothed out during heating by the induction coil. Additional description related to such an embodiment is provided further below with reference to FIGS. 7-9 and FIG. 10, for example.

As disclosed herein, the exemplary injection molding apparatus/system 300 in FIG. 3 includes a multiple, separate induction coils, such as, for example, a load induction coil 320L and a containment induction coil 320C, that are provided as part of a single coil. In embodiments, the induction coils 320L and 320C can emit radiofrequency (RF) waves towards the vessel 312. The coils 320L and 320C may or may not be tapered. The coils 320L and 320C may include, e.g., spherical coil. In embodiments, the coils may have the same or different shapes such that the generated RF fields can be tuned, e.g., be more directional as desired. For example, the containment induction coil 320C can be taper-shaped or cone-shaped coil, with the wide region spacing from, facing, the load induction coil 320L. By using the tuned RF fields, stronger forces can be generated by the containment induction coil 320C and imposed to the melt toward the load induction coil 320L. The melt/molten material can then be contained relative to the load induction coil 320L.

The containment induction coil 320C may be spaced apart but is configured in line with the load induction coil 320L. The containment induction coil 320C can be configured near the ejection end of the melt zone 310. The load induction coil 320L can be configured for heating/melting the material 305 for melting placed in the melting portion 314 of the vessel 310. The containment induction coil 320C can be configured for positioning and/or containing the melt or the molten material within the load induction coil 320L during the heating/melting process. The containment induction coil 320C can prevent the melt or the molten material from flowing out of the load induction coil 320L and the material 305 in the vessel 312 can remain heated and molten. Likewise, the melt/molten material can be contained within the melt zone 310 of the apparatus/system 300 while it's being smoothed out and minimize heat loss.

The containment induction coil 320C and the load induction coil 320L are operated at one frequency $f_{melting}$. However, based on the configuration (e.g., number of turns) of the induction coil, the containment induction coil 320C may impose such force, e.g., Laplace forces, on the melt, to act against those generated by the load induction coil (which tend to push the melt out) and push the melt back to be contained within the vessel near the load induction coil 320L.

Figure 5:
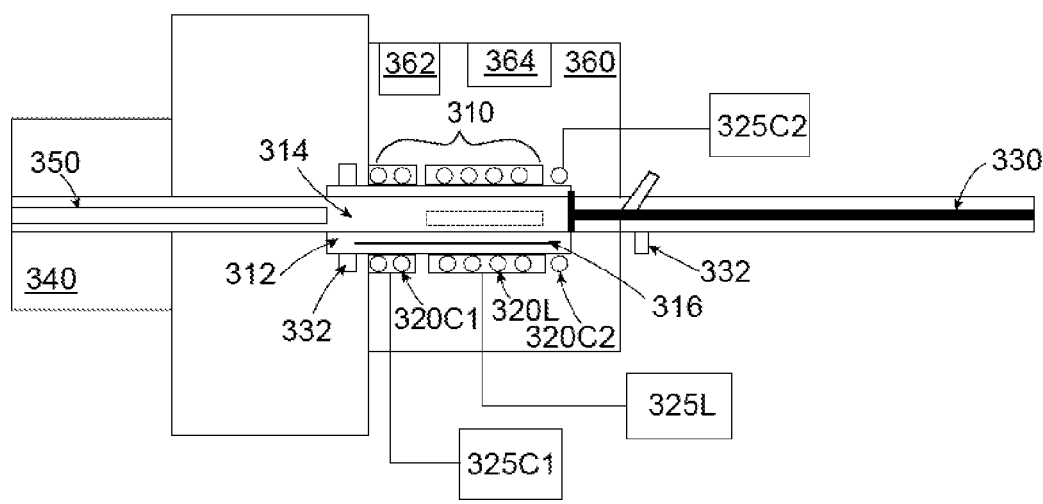
FIG. 5 depicts another exemplary injection molding system/apparatus in accordance with various embodiments of the present teachings.

In embodiments, as shown in FIG. 5, the induction coil can have a load induction coil 320L, a first containment induction coil 320C1, and a second containment induction coil 320C2. The second containment induction coil 320C2 can be configured in line with the load induction coil 320L at an opposite end of the vessel relative to the containment induction coil 320C1, i.e., at an opposite side of the injection path. The first and second containment induction coil 320C1-C2 may have similar or different amounts of helical turns, but are run at the same frequency as the load induction coil 320L. The melt 305 in the vessel 312 can be contained relative to the load induction coil 320L from both ends thereof.

In embodiments, when utilizing BMG as the material in the injection molding apparatus 300/500, articles/parts with a high elastic limit, corrosion resistance, and low density can be formed.

As disclosed herein, then, by spacing adjacent turns of the induction coil in an uneven manner in the longitudinal direction, the frequencies, powers, interaction between magnetic fields produced therefrom, etc. of the load induction coil 320C and the containment induction coil 320C (or 320C1 and 320C2) can be altered such that the materials 305 in the vessel 312 can be heated/melted and further contained within the vessel 312.

Figure 6:
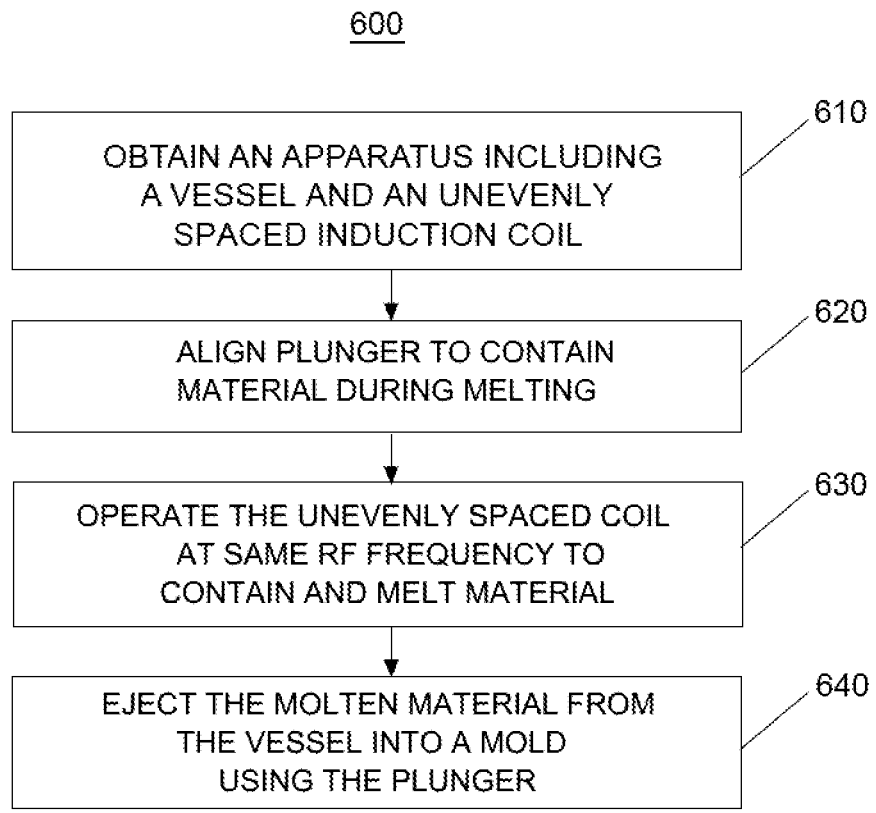
FIG. 6 depicts a method for melting/molding a material in accordance with various embodiments of the present teachings.

FIG. 6 illustrates a method 600 for melting material in accordance with an embodiment of the disclosure using apparatus 300 and/or 500, as shown in FIGS. 3 and 5, and an induction source in the form of a coil, such as the load induction coil 320L and a containment induction coil 320C shown in FIG. 3 or FIG. 5, or any of embodiments of the induction coils 420 shown in any of FIGS. 7-9 (described later), although the apparatus and methods disclosed herein are not limiting with one another in any manner.

At block 610 of FIG. 6, an apparatus is obtained and/or designed to include, for example, a vessel 312 configured to receive a material 305 for melting therein and an unevenly spaced induction coil. Generally, the injection molding apparatus 300/500 may be operated in the following manner: meltable materials for melting 305 (e.g., amorphous alloy or BMG in the form of a single ingot) can be loaded into a feed mechanism (e.g., loading port 318), inserted and received into the melt zone 310 into the vessel 312 (surrounded by the induction coil). The injection molding machine "nozzle" stroke or plunger 330 can be used to move the material, as needed, into the melting portion 314 of the vessel 312.

Figure 8:
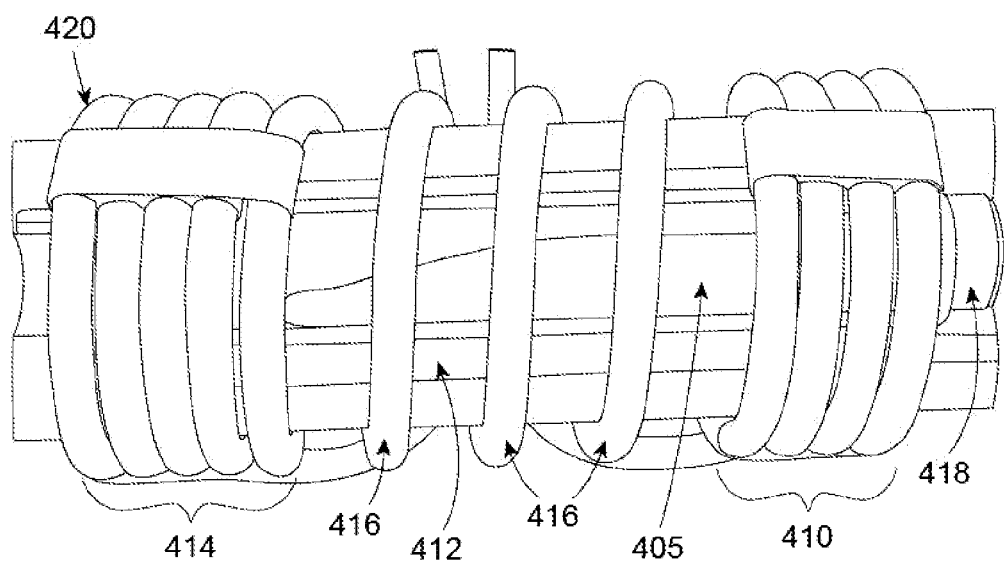
FIG. 8 depicts another induction coil in an injection molding system in accordance with an embodiment.
Figure 9:
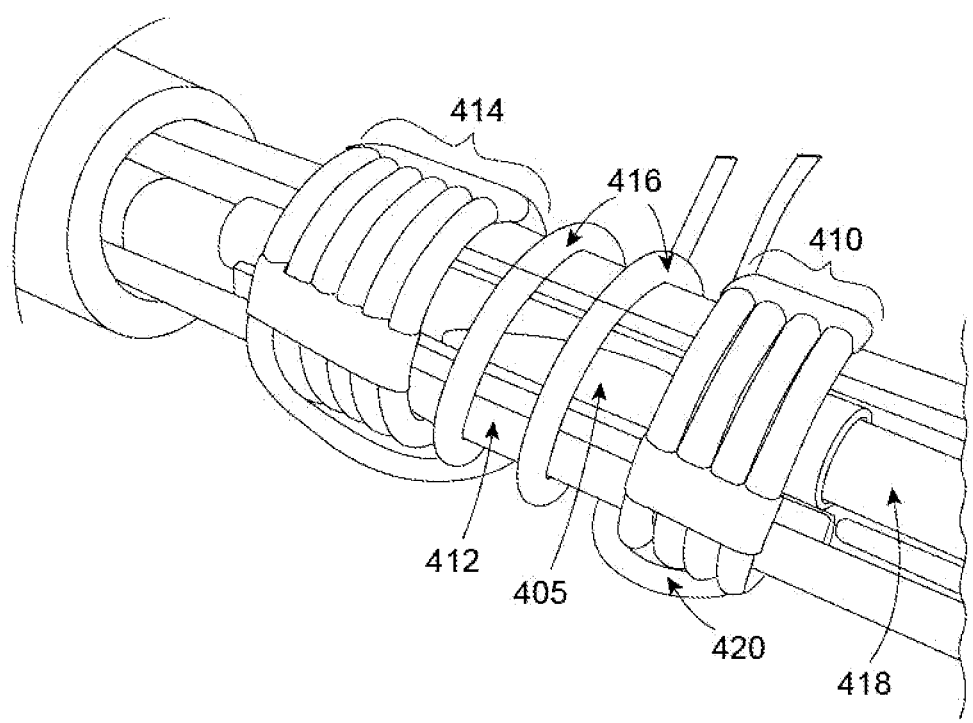
FIG. 9 depicts yet another induction coil in an injection molding system in accordance with an embodiment.

In an embodiment, the tip of plunger 330 can optionally be used to hold or contain the meltable material in the melting portion 314 of the vessel 312 (e.g., see FIGS. 8 and 9). At block 620, the plunger 330 is aligned to contain the material 305 during the melting process, e.g., on a first or right side of the vessel 312 in apparatus 300.

At block 630, the unevenly spaced induction coil is operated at the same RF frequency to contain and melt the material 305. Material 305 can be heated through the induction process, e.g., by supplying power via a power source 325L to the induction coil. The containment side of the induction coil 320C may exert a force, e.g., Laplace forces, on the molten material, acting against those generated by the load side 320L of the induction coil to control the position and shape of the molten material or molten feedstock in the inline melting apparatus without substantially reducing the inductive heating of the molten material 305. During heating/melting, a cooling system can be activated to flow a (cooling) fluid in any cooling channel(s) 316 of the vessel 312. The injection molding machine controls the temperature through a closed or opened loop system, which can stabilize the material 305 at a specific temperature (e.g., detected using a temperature sensor 362 and a controller 364).

Once the desired temperature is achieved and maintained for the melt in the vessel 312, the ejection path of the vessel 312 can be "opened" by turning off the induction coil such that the melt/molten material can be subsequently ejected from the vessel into a mold 340 through an ejection path, e.g., optionally using the plunger, e.g., as seen at block 640 of FIG. 6. The mold 340 can be any mold in a caster such as a cold chamber die. The injection can be performed in a horizontal direction (e.g., from right to left as shown in FIGS. 3 and 5) along the horizontal axis (X axis). This may be controlled using plunger 330, which can be activated, e.g., using a servo-driven drive or a hydraulic drive. The mold 340 is configured to receive molten material through an inlet and configured to mold the molten material under vacuum, for example. That is, the molten material is injected into an evacuated cavity between the at least first and second plates to mold the part in the mold 340. As previously noted, in some embodiments, the material may be an amorphous alloy material that is used to mold a bulk amorphous alloy part. Once the mold cavity has begun to fill, pressure (via the plunger) can be held at a given level to "pack" the molten material into the remaining void regions within the mold cavity and mold the material. After the molding process (e.g., approximately 10 to 15 seconds), the vacuum applied to at least the mold 340 (if not the entire apparatus 300/500) can be released. Mold 340 is then opened and the solidified part is exposed to the atmosphere. In embodiments, an ejector mechanism is actuated to eject the solidified, molded object from between the at least first and second plates of mold 340 via an actuation device (not shown). Thereafter, the process can begin again. Mold 340 can then be closed by moving at least the at least first and second plates relative to and towards each other such that the first and second plates are adjacent each other. The melt zone 310 and mold 340 is evacuated via the vacuum source once the plunger 330 has moved back into a load position, in order to insert and melt more material and mold another part, and to restart the method for melting material.

As previously mentioned with reference to FIG. 4, in an embodiment, a first induction coil and a second induction coil are part of a single induction coil 420 having a configuration that performs both heating and containment functions and that is used to control the melt via RF power. For example, the single induction coil 420 may include an asymmetrical design wherein a profile of unevenly spaced coils are horizontally spaced and positioned along and around a length of the vessel 412 in the horizontal direction. In an embodiment, the induction coil 420 can have a predetermined number of coils provided in relatively spaced sections 410 and 414 (e.g., see FIG. 8), with or without a number of spaced coils 416 therebetween. In an embodiment, a second coil (e.g., containment coil) may be provided on the left and a first coil (e.g., heating coil or melting coil) on the right. Alternatively, the positions (e.g., left and right, relative to a horizontal axis of the vessel) can be switched. The first and second induction coils can be operatively connected as part of a single induction coil and configured to operate at the same frequency and to be unevenly spaced along a length of the vessel (or along a length of a melt zone within the vessel). Accordingly, an unevenly spaced induction coil is defined as a single induction coil having a plurality or multiple helical turns including at least some turns that are unevenly or asymmetrically spaced relative to one or more adjacent turns along its length. The turns can be unevenly or asymmetrically spaced along a length of the melt zone of a vessel that the induction coil is positioned adjacent thereto.

It should be noted that the first and second induction coils, which are also referred to as sections 410 and 412, are also used interchangeably throughout this disclosure (e.g., above with reference to FIGS. 3 and 5) as load induction coil (e.g., 320L) and containment induction coil (e.g., 320C). Accordingly, it should be understood that the terms first, second, section, load, and containment are not intended to be limiting.

Also, in an embodiment, during melting of meltable material, it is also envisioned that a plunger of the system (e.g., plunger rod 330 of system 300) may be configured to assist in containing the meltable material within a vessel. For example, in an embodiment wherein a plunger is configured to move in a horizontal direction from right to left to inject the material into a mold (thus ejecting the molten material from the vessel), the plunger may be positioned to contain a melt from a right side to keep molten material from being ejected out the wrong side. The coil configuration may be designed to contain the melt on the opposite side leading to the mold (left side). FIGS. 8 and 9 illustrate exemplary embodiments implementing a plunger 418 (which may be similar to plunger rod 330 of system 300) provided adjacent a first (e.g., right) side of an unevenly spaced coil to assist in containing meltable material 405 within vessel 412 during the melt process.

Figure 7:
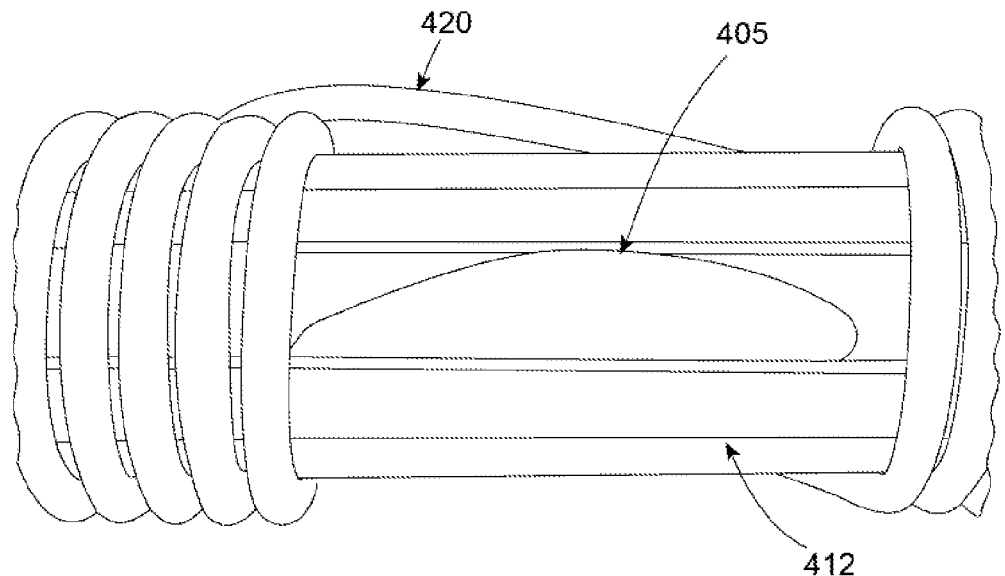
FIG. 7 depicts an induction coil in an injection molding system in accordance with an embodiment.

FIGS. 7 to 9 show various embodiments of the apparatus. The first section or first induction coil and the second section or second induction coil are part of a single induction coil that are operatively connected and configured to operate at the same frequency. The first section and the second section are positioned relatively away from each other along an axis of the vessel such that a space is formed therebetween. The induction coil imposes forces on the molten material in the vessel that is relatively or adjacently positioned within the space between the first and second sections of the coil during its operation (e.g., during RF application). For explanatory purposes only, it should be understood that FIGS. 7-9 reference a vessel positioned on a horizontal axis and configured for injection of molten material into a mold in a horizontal direction, out of a vessel, from right to left. However, the direction of movement is not meant to be limiting. In an embodiment, one or more turns of the coil may be provided in the space between the first and second sections of the coil, spaced relatively from each section and/or from one or more adjacent turns of the coil. In any of these embodiments, the material for melting could include a BMG feedstock, and the apparatus is configured to mold the material into a BMG part.

The apparatus could include a vessel 412 configured to receive a material such as an ingot for melting therein. Shown in these embodiments are a first section 410 of the single induction coil 420 and a second section 414 of the single induction coil 420, which is positioned in line with the first induction coil. The first section 410 (or first induction coil) has a first predetermined number of turns positioned substantially around the vessel 412 and the second section 414 (or second induction coil) has a second predetermined number of turns positioned substantially around the vessel. A combination of the first and the second induction coil sections 410 and 414 is configured to function as a gate or a valve for containing movement of the molten material 405 in a horizontal direction within the vessel 412. Further, the single induction coil can include a one or more spaced turns between the turn(s) of the first induction coil/section 410 and the turn(s) of the second induction coil/section 414. The one or more turn(s) can be spaced a distance from both of the first section and from the second section. The distance from the first section and the second section can be similar or different.

The profiling of the induction coil 420 can be used to change the field strength (RF power) at different positions along the vessel 412 and the coil. Thus, in accordance with an embodiment herewith, a system, a machine or a device, such as an injection molding system (e.g., system 300), uses an induction coil with uneven spacing between its coil turns with some areas of the induction coil 420 having a relatively tighter spacing between turns and some areas having a relatively larger spacing.

Generally, the intensity of the magnetic field is relatively greater in areas where adjacent turns of the coil have tighter spacing or are relatively spaced closer together. The field inside an induction coil can be approximated by the field inside an infinite solenoid, which is expressed as, $$B = \mu_0 I \, n$$

where B is the strength of the magnetic field,
$\mu_0$ is the permeability of free space,
I is the coil current, and
n is the number of turns per length.

Though induction coils may show fringing effects because they are not infinite, the field strength in a region is still roughly proportional to the number of turns per length.

Because the molten material in a vessel will tend to move (away) from an area of relatively stronger magnetic field to (or towards) a relatively weaker magnetic field, when implementing an unevenly spaced coil, such as disclosed herein (such as in FIGS. 7-9), the molten material is substantially forced and moved within the vessel relative to the coil to areas of the vessel with fewer turns per unit length. This allows the melt to be fully contained by the electromagnetic forces, while still allowing the melt or molten material to be heated beyond the liquidus temperature. The unevenly spaced coil also provides the ability to push the material around physically and to shape it in a way that is conducive to a selected process (e.g., injection molding).

The first and second sections of the induction coil may have similar or different predetermined amounts of helical turns positioned around the vessel, and are run or operated at the same frequency. In an embodiment, the first predetermined number of turns in the first section is different that the second predetermined number of turns in the second section. In an embodiment, the first predetermined number of turns of the first induction coil or section 410 is asymmetrical relative to a number of the second predetermined number of turns of the second induction coil or section 414. In an embodiment, the number of turns of the first induction coil or section 410 is smaller relative to a number of turns of the second induction coil or section 414.

Each turn in the first predetermined number of turns and in the second predetermined number of turns of the first and second sections can be equidistantly spaced relative to one or more adjacent turn(s) in the same respective section, in accordance with an embodiment. In an embodiment, each turn in each section is spaced at a different relative distance from another turn in the same section.

As noted, a number of spaced turns 416 (e.g., one or more) can be provided between the turns of the first induction coil/section 410 and the turns of the second induction coil/section 414 (within a space or distance between the two, along the axis). In an embodiment, the spacing between adjacent turns of the coil can be relatively lesser (or substantially not provided at all) in a substantially center portion adjacent to the vessel and relatively greater at one or both ends adjacent to a vessel. For a coil with tighter spacing between adjacent turns on both ends (relative to spacing of coils within the center), the melt may be completely contained by the coil alone. FIG. 4 illustrates an embodiment of such spacing. FIG. 7 also depicts an embodiment of a vessel 412 and an induction coil 420 having unevenly spaced sections that are configured for use in an injection molding system. The sections of the induction coil 420 may impose forces on the material 405 for melting, e.g., metals/metal alloys, that is placed inside the vessel 412, and ultimately, when the material 405 is molten, the induction coil 420 imposes forces on the molten material 405 within the space between the sections of the coil 420. These forces may act to squeeze the molten material inwards to the center of the vessel, as shown.

In an embodiment, the coil spacing can be relatively greater in substantially a center portion of the vessel and relatively lesser on one or both ends.

In an embodiment, when the single induction coil has a relatively tighter turn spacing on or adjacent only one end of a vessel (e.g., the spacing between turns is less), another force or object can be provided to constrain the melt or molten material so that it remains within the area of the vessel surrounded by the coil to complete the melting process. For example, as previously mentioned, a plunger of the system may be configured to assist in containing the meltable material within a vessel. That is, in an embodiment, a plunger can be configured to function as a gate or a valve for containing movement of the molten material 405 in a horizontal direction within the vessel 412. FIGS. 8 and 9 illustrate embodiments of induction coil 420 used with a vessel 412 and a plunger 418. The plunger 418 may be positioned to contain a melt from a first (right) side (adjacent to first induction coil) to keep molten material from being ejected out a second (left or wrong) side (the injection side, for movement of the molten material into the mold). The coil configuration may be designed to contain the melt or molten material on the opposite side leading to the mold (left side). The plunger 418 is configured to move in a horizontal direction from right to left to inject the material into a mold (thus ejecting the molten material from the vessel) after the melting process is complete. The plunger tip 418 just pushes forward into the mold. In an embodiment, power to the induction coil 420 is maintained until after the molten material has fully exited the vessel and adjacent turns of the coil to ensure the material is heated as long as possible before injection into a mold.

Additionally, when using plunger 418 to contain material on one side, one can afford a much tighter spacing between the turns of the coil on the first side, allowing for a much hotter melt overall because less power is lost. When using a plunger on one side to contain a material during the melting process, such as shown in FIG. 8, a more efficient coil can be implemented in the system, since power is used to heat on a first (right) side.

FIGS. 8 and 9 further illustrate how changing a number or series of turns and a spacing of the turns and/or series of turns along the length of an induction coil allow for pushing the material towards a preferred location (e.g., back) while still melting it, so that material will not spill or move out of the RF field. In an embodiment, the induction coil 420 includes a design that includes a first section 410 having a number or series of more tightly wound turns of the coil on the first (right or front) side, a second section 414 having a number or series of more tightly wound turns on the second (left or back) side (e.g., for injection), and having some looser spaced or separated coil turns between or substantially in the middle of the two sections 410 and 414. That is, the adjacent turns of the coil in the first section 410 and in the second section 414 are each spaced at a distance that is relatively closer than a distance between each of the adjacent turns of the coil in the center. This is so that the RF field is relatively stronger on or adjacent the ends of the coil (and thus, the vessel) and then relatively weaker therebetween or substantially in the middle. Accordingly, the material can be moved towards a center of a melt zone to be between/in the middle of the sections 410 and 414, because, as previously mentioned, as the field from the coil applies a force to the melt, and the melt wants to be wherever the field is weaker (so it tends to go from high strength to low strength areas of the field). Since there are lesser turns of the coil between the sections 410 and 414, and each turn can be spaced such that they are separated, the RF field being projected towards the material/vessel is relatively weaker. Material is substantially contained therebetween and does not advance through either of the ends of the vessel 412 (where the field is relatively stronger) without being forced (e.g., via a plunger 418). Also, a larger number of closely positioned adjacent turns of the coil can be provided in the first section 410 close to the plunger tip 418, as compared to the turns 416 of the spaced coils therebetween, because the plunger tip 418 is not only used to contain the material, which allows for greater focus of the induction field when melting, but also because the plunger 418 generally includes its own cooling system, thus the tip can be cooled despite the larger RF field, while still holding the material and preventing molten material from spilling out.

FIG. 8 illustrates an embodiment of an induction coil 420 in a system 402 having approximately four turns of the coil in its first section 410, approximately five turns of the coil in its second section 414, and approximately three turns of relatively spaced turns 416 of the coil therebetween. FIG. 9 illustrates an embodiment of an induction coil 420 in a system 404 having approximately four turns of the coil in its first section 410, approximately six turns of the coil in its second section 414, and approximately two turns of relatively spaced turns 416 (e.g., single turns) of the coil therebetween. As shown, the turns of the first section 410 and of the second section 414 in FIGS. 8 and 9 can be spaced relatively close to one another. In an embodiment, the turns associated with each section 410 and 414 can be secured or bound together.

The turns 416 of spaced coils in FIGS. 8 and 9 are spaced a distance from the first and second sections 410 and 414 and are also spaced a distance relative to one another, as shown. In an embodiment, a relative distance between each of turn 416 of the spaced coils is substantially equal. In an embodiment, the distance between turn(s) of the first section 410 and an adjacent spaced turn 416 (e.g., on the right side) is substantially similar to a distance between turn(s) of the second section 414 and another adjacent spaced turn 416 (e.g., on the left side, or an opposite side, closer to the second section 414). In an embodiment, the distance between the first section 410 and/or second section 414 of coils relative to an adjacent spaced coil 416 is substantially the same as a distance between each spaced coil 416.

In an embodiment, each of the spaced turns 416 is spaced a distance relative to each other and/or the first and second induction coils that is larger than distances between each of the adjacent, predetermined number of turns of the first and second induction coils. That is, for example, the spacing between the turns of the coil associated with the first section 410 and/or the second section 414 can be more closer together and/or tightly wound relative to one another, while the spaced turns 416 are farther apart and have greater or looser spacing relative to adjacent turns (either from another spaced turn 416 or from one of the first or second sections).

However, the iterations and/or turns of the coil, as well as the number of coil turns in first section 410, second section 414, and/or spaced coils 416 and a size or distance therebetween is not intended to be limited. For example, although FIG. 8 and FIG. 9 each show an example utilizing two single, separate, spaced turns of the coil in the space between the relatively spaced first and second sections, with each turn of the coil further being spaced from another, it should be understood that each spaced turn or section of coil between the first and second sections can include two or more turns of the coil within the space. Further, the number of turns associated with the at least one turn of coil within the space between the first and second sections, and spaced therefrom, is not limited. Any number of turns, spaces, and/or distances can be used to obtain unevenly spaced coil turns along the length of the induction coil 410 and to tune the induction unit for melting material. Also, different spacings or a different number of turns within the single induction coil 420 may be substantially equally or even more effective than those illustrated, and should still be considered as part of this disclosure. In an embodiment, the length of the vessel or size of the area for applying the induction/RF field can be used to determine the number of turns and/or configuration of the unevenly spaced induction coil 420. In an embodiment, the size of the tubing (e.g., quarter inch, ⅜ inch) can affect and/or determine the turns and/or configuration of the unevenly spaced induction coil 420. In an embodiment, both the length of the field and the size of the tubing is used to determine the configuration of the unevenly spaced induction coil. In an embodiment, a single induction coil 420 uses thicker tubing and fewer turns. In an embodiment, a single induction coil 420 uses thinner tubing and more turns.

The tuning of the induction coil 420 changes depending on the number of turns of the coil and in their spacing, thus resulting in the power supply needing to be retuned for different configurations. Generally, however, it can be beneficial to provide a few, tightly spaced turns on a first (right or front) side to contain (or assist in containing) the material to melt and then spaced coils 416 with as tight a spacing in the middle as will be allowed without losing containment. A larger amount of tightly spaced turns on a second side is beneficial for containment during melting.

In a traditional solenoid induction coil with a constant turn spacing, the magnetic field tends to pinch the melt in the center and force molten alloy out both ends, which is a problem when the material needs to be contained for melting and more especially for obtaining a substantially even melting, such as is the case with bulk amorphous alloys. This problem is exacerbated on a horizontal in-line injection molding system where forces of gravity do not assist in melt containment at both ends.

By designing a coil with a non-uniform spacing, such as disclosed herein, the melt can be fully contained in the coil while still being melted, acting as a trap to contain the melt. Thus, the unevenly spaced induction coil can also be referred to as a "trap coil". The induction coil design fits within a generally smaller or shorter area (which can reduce the length of the system overall) and provides a higher volume to service area ratio, so that the molten material does not cool down as much at the surface of the vessel. In operation, the melt temperature and stirring remains relatively uniform in the region between the first and second sections 410 and 414 (or first and second induction coils) of the single induction coil.

The material can be fully contained by the unevenly spaced induction coil without the assistance of the plunger tip or gate, or both. For example, some designs have a mechanical gate adjacent to a back side (or injection side) of a vessel that is configured for movement (e.g., dropping) into place for melting and then, preceding injection, configured for movement (e.g., lifted up) out of place to allow the molten material to spill out and the plunger tip to move forward for injection, preferably without hitting anything. However, such mechanical gates tend to be unreliable and can fail for reasons including, but not limited to: material sticking to the gate itself, the gate or a portion thereof being destroyed (e.g., if made of a ceramic, high temperatures of molten bulk amorphous alloy can damage it), and material sticking or getting caught under the gate thereby preventing the gate fully closing during the following cycle. In such a case, melt can and does leak out underneath the gate. Such limitations result in a point of failure in systems with gates not only for melting purposes of the material, but also because insufficient melting or containment during the melt process can result in an inferior molded product. Further, because of such failures resulting from the mechanical gate, the number of repetitive cycles and/or use of the system can be limited, thus deeming the gates unreliable. Further, even if a position of the system is changed, e.g., if the system is tilted at an angle so that gravity may help reduce spilling out before injection, it was found that even with such tilting, the induction field of the induction coil can still defy gravity during melting and push the melt out of the melting region.

The disclosed unevenly spaced induction coil also eliminates one or two of the cooled surfaces against which the molten material rests (e.g., gate or plunger), which tend to cool the material via their own cooling systems. Such cooling of the molten material is undesirable due to possible defects in final products. Therefore, a higher and more uniform temperature of the molten material is achieved when the disclosed unevenly spaced induction coil is implemented in an injection system. Further, because the material is not shielded by a gate and/or plunger tip when melting in the vessel, the material catches more of the magnetic flux produced by the induction coil.

Further, using an unevenly spaced induction coil adjacent a vessel provides a reliable containment system for containing material in a melting portion of a vessel during the melting process that is suitable for repeatable use under normal operation. Once the coil is turned on, then the containment system will also work substantially without any chance of failure.

It should be understood that the system or apparatus and/or vessel shown and/or described with reference to FIGS. 7-10 could further include additional features such as those previously described above (e.g., temperature regulating channels, additional induction coils, valves, etc.—with reference to FIGS. 2A to 2D, FIG. 3, etc.), although such features are not explicitly mentioned and/or repeated here. Also, shown in FIG. 9 are two leads extending out from the induction coil 420, which can be connected directly to an induction unit or bus bars in the machine or system. Such leads and units can also be included in the embodiments described with reference to FIGS. 7 and 8, or FIGS. 2 through 5, although not necessarily shown in the Figures.

As disclosed herein, the exemplary injection molding apparatus/system 300 or 500 in FIG. 3 or FIG. 5 can be fitted with an induction coil having unevenly spaced sections 410 and 414, as shown in FIGS. 7 to 9, for example. In embodiments, the induction coils 410 and 414 can emit radiofrequency (RF) waves towards the vessel 412. The sections 410 and 414 may or may not be tapered. The sections 410 and 414 of coil may include, e.g., spherical coil.

The sections 410 and 414 of the induction coil 420 are operated the same frequencies in order to position/contain the melt, e.g., at melting temperatures. Based on the numbers of turns and the spacing of coils in each section, the molten material is contained. For example, the second section 414 of the induction coil 420 may impose such force, e.g., Laplace forces, on the melt 405, to act against those generated by the first section 410 of the induction coil (which tend to push the melt out) and push the melt back to be contained within the vessel 412 between the two sections.

Although not described in great detail, any of the disclosed injection systems may include additional parts including, but not limited to, one or more sensors, flow meters, etc. (e.g., to monitor temperature, cooling water flow, etc.), and/or one or more controllers. The material to be molded (and/or melted) using any of the embodiments of the injection system as disclosed herein may include any number of materials and should not be limited. In one embodiment, the material to be molded is an amorphous alloy, as described above.

Applications of Embodiments

The presently described apparatus and methods can be used to form various parts or articles, which can be used, for example, for Yankee dryer rolls; automotive and diesel engine piston rings; pump components such as shafts, sleeves, seals, impellers, casing areas, plungers; Wankel engine components such as housing, end plate; and machine elements such as cylinder liners, pistons, valve stems and hydraulic rams. In embodiments, apparatus and methods can be used to form housings or other parts of an electronic device, such as, for example, a part of the housing or casing of the device or an electrical interconnector thereof. The apparatus and methods can also be used to manufacture portions of any consumer electronic device, such as cell phones, desktop computers, laptop computers, and/or portable music players. As used herein, an "electronic device" can refer to any electronic device, such as consumer electronic device. For example, it can be a telephone, such as a cell phone, and/or a land-line phone, or any communication device, such as a smart phone, including, for example an iPhone™, and an electronic email sending/receiving device. It can be a part of a display, such as a digital display, a TV monitor, an electronic-book reader, a portable web-browser (e.g., iPad™), and a computer monitor. It can also be an entertainment device, including a portable DVD player, DVD player, Blu-Ray disk player, video game console, music player, such as a portable music player (e.g., iPod™), etc. It can also be a part of a device that provides control, such as controlling the streaming of images, videos, sounds (e.g., Apple TV™), or it can be a remote control for an electronic device. It can be a part of a computer or its accessories, such as the hard driver tower housing or casing, laptop housing, laptop keyboard, laptop track pad, desktop keyboard, mouse, and speaker. The coating can also be applied to a device such as a watch or a clock.

While the invention is described and illustrated here in the context of a limited number of embodiments, the invention may be embodied in many forms without departing from the spirit of the essential characteristics of the invention. The illustrated and described embodiments, including what is described in the abstract of the disclosure, are therefore to be considered in all respects as illustrative and not restrictive. The scope of the invention is indicated by the appended claims rather than by the foregoing description, and all changes that come within the meaning and range of equivalency of the claims are intended to be embraced therein.

What is claimed is:

1. An apparatus comprising:
a vessel positioned along a horizontal axis and configured to receive a material for melting therein;
a first induction coil having a first number of turns encircling the vessel; and
a second induction coil set apart from the first induction coil along the horizontal axis and having a second number of turns encircling the vessel, the second number of turns being different from the first number of turns; and
a third induction coil having at least one turn encircling the vessel, located between the first induction coil and the second induction coil, set apart from the first induction coil by a first distance greater than a first spacing between adjacent turns of the first induction coil, and set apart from the second induction coil by a second distance greater than a second spacing between adjacent turns of the second induction coil.

2. The apparatus of claim 1, wherein:
the first induction coil is configured to impart a first force on the material; and
the second induction coil is configured to impart a second force opposite the first force on the material.

3. The apparatus of claim 1, wherein the first and second induction coils are sections of a single induction coil structure.

4. The apparatus of claim 1, wherein the third induction coil comprises a plurality of turns.

5. The apparatus of claim 4, wherein the third induction coil joins the first induction coil to the second induction coil.

6. The apparatus of claim 4, wherein adjacent turns of the third induction coil are spaced apart from each other by a third spacing that is larger than the first spacing and the second spacing.

7. The apparatus of claim 4, wherein the third coil has fewer turns than the first coil and the second coil.

8. An apparatus comprising:
a vessel oriented substantially horizontally and configured to receive a material for melting therein; and
an induction coil structure oriented substantially horizontally and encircling at least a portion of the vessel, comprising:
a first section having a first coil spacing;
a second section having a second coil spacing; and
a third section between and set apart from the first and second sections and having a third coil spacing different from the first coil spacing.

9. The apparatus of claim 8, wherein the first coil spacing is substantially the same as the second coil spacing.

10. The apparatus of claim 9, wherein the third coil spacing is greater than the first and the second coil spacing.

11. The apparatus of claim 10, wherein the induction coil structure is a unitary coil.

12. The apparatus of claim 11, wherein the induction coil structure is configured to maintain a molten material substantially between the first and second sections of the induction coil structure when the induction coil structure is excited at a frequency.

13. The apparatus of claim 8, wherein the first, second, and third sections all have different numbers of coil turns.

14. The apparatus of claim 8, wherein the third section has fewer coil turns than the first section.

15. The apparatus of claim 8, wherein a distance between the third section and the first section is substantially equal to a distance between the third section and the second section.

16. An injection molding system, comprising:
a mold defining a mold cavity;
a vessel defining a melt zone in communication with the mold cavity;
a first coil having a first number of turns, encircling a first portion of the vessel, and configured to melt a material received in the melt zone; and
a second coil having a second number of turns, encircling a second portion of the vessel between the mold and the first coil, and configured to prevent the material from entering the mold cavity while the material is being melted, the second number of turns being different from the first number of turns; and
a third coil having a plurality of turns encircling the vessel, located between the first coil and the second coil, set apart from the first coil by a first distance greater than a first spacing between adjacent turns of the first coil, and set apart from the second coil by a second distance greater than a second spacing between adjacent turns of the second coil.

17. The system of claim 16, wherein the vessel is a substantially cylindrical vessel having a longitudinal axis positioned substantially horizontally.

18. The system of claim 16, wherein the first coil has more turns than the second coil.

19. The system of claim 16, further comprising a power supply coupled to the first and second coils and configured to excite the first and second coils with a single output having a frequency.

20. The system of claim 19, wherein
the first and second coils are configured to maintain the material substantially between the first and second coils when the first and second coils are excited at the frequency.

* * * * *